(12) United States Patent
Corbett et al.

(10) Patent No.: US 11,054,356 B2
(45) Date of Patent: Jul. 6, 2021

(54) PARTICLE CHARACTERISATION WITH A FOCUS TUNEABLE LENS

(71) Applicant: Malvern Panalytical Limited, Malvern (GB)

(72) Inventors: Jason Cecil William Corbett, Malvern (GB); David Bryce, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 0 days.

(21) Appl. No.: 16/492,329

(22) PCT Filed: Oct. 24, 2017

(86) PCT No.: PCT/GB2017/053204
§ 371 (c)(1),
(2) Date: Sep. 9, 2019

(87) PCT Pub. No.: WO2018/162869
PCT Pub. Date: Sep. 13, 2018

(65) Prior Publication Data
US 2020/0166446 A1 May 28, 2020

Related U.S. Application Data

(63) Continuation-in-part of application No. 15/454,814, filed on Mar. 9, 2017, now Pat. No. 10,365,198.

(51) Int. Cl.
*G01N 15/02* (2006.01)
*G01N 15/00* (2006.01)

(52) U.S. Cl.
CPC . *G01N 15/0211* (2013.01); *G01N 2015/0046* (2013.01); *G01N 2015/0222* (2013.01); *G01N 2015/03* (2013.01)

(58) Field of Classification Search
CPC .......... G02B 2027/014; G02B 27/0093; G02B 2027/0138; G02B 27/0172;
(Continued)

(56) References Cited

U.S. PATENT DOCUMENTS

| | | | |
|---|---|---|---|
| 4,273,443 | A | 6/1981 | Hogg |
| 4,690,561 | A | 9/1987 | Ito |

(Continued)

FOREIGN PATENT DOCUMENTS

| | | |
|---|---|---|
| DE | 202016006846 | 2/2017 |
| EP | 2721399 | 4/2017 |
| WO | 2016/034902 | 3/2016 |

OTHER PUBLICATIONS

Corbett, U.S. Office Action dated Aug. 13, 2018, directed to U.S. Appl. No. 15/454,814; 13 pages.
(Continued)

*Primary Examiner* — Michael P Stafira
(74) *Attorney, Agent, or Firm* — Morrison & Foerster LLP

(57) ABSTRACT

A particle characterisation apparatus comprising: a light source for illuminating a sample with a light beam; a detector arranged to detect scattered light from the interaction of the light beam with the sample; a focus tuneable lens arranged to collect the scattered light for the detector from a scattering volume and/or to direct the light beam into the sample, a sample holder with an opposed pair of electrodes and configured to hold a sample in position in a measurement volume between the pair of electrodes such that a planar surface of the sample is aligned orthogonally to the electrode surfaces, the planar surface adjacent to the scattering volume, wherein adjustment of the focus tuneable lens results in adjustment of the relative position of the planar surface and the scattering volume by moving the scattering volume.

19 Claims, 11 Drawing Sheets

(58) Field of Classification Search
CPC ........ G02B 2027/0185; G02B 21/0032; G02B
27/0179; G02B 2027/0178; G02B 27/017;
G02B 2027/0187; G02B 2027/0118;
G02B 23/00; G02B 23/02; G02B 23/06;
G02B 26/06; G02B 26/0816; G02B
27/40; G02B 7/003; G02B 17/008; G02B
2027/0112; G02B 21/002; G02B 21/0096;
G02B 21/02; G02B 21/06; G02B 21/18;
G02B 21/361; G02B 21/367; G02B
27/0025; G02B 27/0068; G02B 5/30;
G02B 6/12019; G02B 13/0005; G02B
13/22; G02B 2027/011; G02B 2027/0123;
G02B 2027/0127; G02B 2207/113; G02B
2207/115; G02B 26/126; G02B 27/0176;
G02B 27/0955; G02B 3/14; G02B 5/04;
G02B 5/18; G02B 5/1842; G02B 5/28;
G02B 7/32; G01B 11/2513; G01B
11/2518; G01B 2210/58; G01B 11/00;
G01B 11/25; G01B 11/26; G01B 11/27;
G01B 9/02041; G01B 9/02044; G01B
9/02068; G01B 9/02091; G01J 9/00;
G01J 3/021; G01J 3/0224; G01J 3/0229;
G01J 3/0237; G01J 3/027; G01J 3/32;
G01J 3/36; G01J 1/0437; G01J 1/42;
G01J 2009/002; G01J 4/04; G01J 1/08;
G01J 1/4228; G01J 1/44
See application file for complete search history.

(56) References Cited

U.S. PATENT DOCUMENTS

| | | | | |
|---|---|---|---|---|
| 6,178,346 | B1 | 1/2001 | Amundson et al. | |
| 7,202,953 | B1 * | 4/2007 | Mueller | G01J 3/02 |
| | | | | 250/201.2 |
| 7,679,743 | B1 * | 3/2010 | Jung | G01N 15/0205 |
| | | | | 356/335 |
| 8,018,582 | B2 * | 9/2011 | Jeong | G01J 3/0291 |
| | | | | 356/73 |
| 8,427,641 | B2 * | 4/2013 | Babico | G01J 3/0216 |
| | | | | 356/336 |
| 2005/0110996 | A1 * | 5/2005 | Sharpe | G01N 15/1436 |
| | | | | 356/338 |
| 2009/0075391 | A1 * | 3/2009 | Fulghum, Jr. | A61B 1/0669 |
| | | | | 436/164 |
| 2009/0180120 | A1 | 7/2009 | Kanayama | |
| 2010/0020312 | A1 | 1/2010 | Jeong et al. | |
| 2013/0320216 | A1 | 12/2013 | Aiko et al. | |
| 2014/0152986 | A1 | 6/2014 | Trainer | |
| 2014/0247450 | A1 * | 9/2014 | Han | G01N 15/1459 |
| | | | | 356/338 |
| 2014/0268079 | A1 * | 9/2014 | Kim | G01N 15/1434 |
| | | | | 355/67 |
| 2015/0115174 | A1 | 4/2015 | Chen | |
| 2016/0123875 | A1 * | 5/2016 | Cierullies | G01N 21/53 |
| | | | | 356/338 |
| 2016/0146732 | A1 | 5/2016 | Freitag et al. | |
| 2016/0202164 | A1 | 7/2016 | Trainer | |
| 2016/0290912 | A1 | 10/2016 | Kent et al. | |
| 2017/0234788 | A1 | 8/2017 | Di Carlo et al. | |
| 2017/0248510 | A1 | 8/2017 | Pedrono et al. | |
| 2017/0307495 | A1 | 10/2017 | Corbett et al. | |

OTHER PUBLICATIONS

Corbett, U.S. Office Action dated Jan. 19, 2018, directed to U.S. Appl. No. 15/454,814; 11 pages.

International Search Report and Written Opinion dated Jan. 25, 2018, directed to International Application No. PCT/GB2017/053204; 14 pages.

Optotune located at www.optotune.com/publications-2, visited on Mar. 29, 2017; 3 pages.

* cited by examiner

PARTICLE CHARACTERISATION WITH A FOCUS TUNEABLE LENS

REFERENCE TO RELATED APPLICATIONS

This application is a national stage application under 35 USC 371 of International Application No. PCT/GB2017/053204, filed Oct. 24, 2017, which claims the priority of U.S. application Ser. No. 15/454,814, filed Mar. 9, 2017, the entire contents of each of which are incorporated herein by reference.

BACKGROUND OF THE INVENTION

The present invention relates to a method and apparatus for particle characterisation.

SUMMARY OF THE INVENTION

Photon correlation spectroscopy (or dynamic light scattering, DLS) measures the time resolved signal scattered from particle suspensions. The relaxation time of the sample is determined using the correlation function of the scattered signal, from which the particle size distribution can be estimated. The technique works best when each particle in suspension scatters light from the illuminating light beam (e.g. laser) only and not light that has already been scattered from other particles. At high concentrations multiple scattering tends to degrade the technique.

Within a small range of backscattered angles, multiply scattered signals may have an almost identical relaxation time (from which the particle size is calculated) to the singly scattered signal.

An existing technique (which may be termed non-invasive back scatter, or NIBS) uses a moving lens to place an illuminating laser optical path and a backscatter detection optical path into a variable position within a sample cell/cuvette, as shown in FIGS. 1 and 2. The intersection of the illuminating optical path and the detection optical path may be termed the detection region or scattering volume.

When the sample is turbid (i.e. has a high concentration of particles), the detection region can be placed near to the cell wall, which significantly reduces multiple scattering due to the foreshortened illumination path length within the sample. In addition, a backscatter angle may be selected at which multiply scattered signals have a similar relaxation time to singly scattered signals, as already described.

Moving the detection region within the cell is advantageous, and it is also advantageous to maintain a selected angle of detection throughout the range of movement, so as to combine both benefits mentioned above.

At low particle concentration, the detection region may be moved toward the cell centre, or at least away from the static scattering contribution from the wall. Whilst the static scattering contribution from the wall may be negligible compared with the scattering contribution from particles in a high concentration sample, such static scattering from the wall may be a source of uncorrelated noise (or even static reference signal), for low concentration samples. The static scattering contribution from the wall may therefore decrease signal to noise ratio. The static scattering increases the correlogram baseline and thence reduces its intercept, which is a measure of the signal-to-noise of the measurement. Moving the detection region away from the cell wall may therefore improve the signal to noise ratio.

In the low sample concentration limit, DLS suffers from number fluctuations, whereby the scattered signal varies because of the fluctuation in the number of particles within the detection region, in addition to the contribution to the scattering from the Brownian motion of the particles. However, it may not be practical to simply expand the size of the detection beam to accommodate more particles, because this may make the size of the beam larger than a single coherence area. The highest signal-to-noise measurements using DLS may rely on measurement from within a single coherence area.

The signal to noise ratio of the correlogram is generally interpreted from the intercept of the correlogram and the y-axis. In order to maximise this value a single mode fibre may be used in the detection optical path, to select out a single spatial frequency from the 'image' of the speckle field. Simply increasing the size of the detection optical path may result in non-optimal coupling into such a fibre or may collect light from more than one coherence area, which may reduce the signal to noise ratio.

A method and apparatus for solving or ameliorating at least some of the above mentioned problems is desirable.

WO2016/034902 discloses a particle characterisation apparatus comprising: a sample cell for holding a sample, a light source for producing a light beam for illuminating the sample in the sample cell, thereby producing scattered light by the interaction of the light beam with the sample; a focusing lens for focusing the light beam within the sample; and a detector for detecting the scattered light along a detection optical path that intersects the focused light beam within the sample, the intersection of the focused light beam and the detection optical path in the sample defining a detection region; wherein the apparatus comprises an optical arrangement for varying the volume of the detection region and the focusing lens is moveable, so as to vary a location of a focal plane of the light beam and detection optical path in the sample with movement of the focusing lens so as to vary the position of the detection region within the sample.

According to a first aspect of the invention, there is provided a particle characterisation apparatus comprising: a light source for illuminating a sample with a light beam; a detector arranged to detect scattered light from the interaction of the light beam with the sample; and a focus tuneable lens arranged to collect the scattered light for the detector from a scattering volume and/or to direct the light beam into the sample, wherein the apparatus is arranged so that adjustment of the focal length of the focus tuneable lens results in a change in the location of the scattering volume without a change in the angle between the illumination and detection optical paths.

The terms "scattering volume" and "detection region" are synonymous in this disclosure. The angle between the illumination and detection optical paths is that measured at the scattering volume, and this angle may be referred to as the "scattering angle" in this disclosure.

A focusing lens may be provided between the focus tuneable lens and the sample (e.g. along the illumination and/or detection optical path). The focusing lens may comprise at least one fixed focal length lens.

The focusing lens may have a focal point on a principle plane of the focus tuneable lens. This arrangement is an elegant way to achieve a constant scattering angle as the location of the scattering volume is adjusted.

The focusing lens may have a further focal point within the sample cell (or sample). This arrangement means that the focusing lens images the scattering volume at the focus tuneable lens.

The location of the scattering volume may be adjustable without translating a lens or lens element, which may make the apparatus more reliable, and/or may allow for faster adjustment of the illumination and/or detection optical path.

The apparatus may comprise a sample cell, and/or a sample cell holder, for receiving the sample (e.g. in the sample cell).

The apparatus may comprise a detection optical path, by which the scattered light reaches the detector, and an illumination optical path, by which the light beam reaches the sample from the light source. Both the detection optical path and the illumination optical path may pass through the focus tuneable lens. In some embodiments only the detection optical path or only the detection optical path may pass through the focus tuneable lens.

The focus tuneable lens may have an optical axis. The detection optical path may be at a first (non-zero) angle to the optical axis. The illumination optical path may be at a second (non-zero) angle to the optical axis. The first angle and second angle may be substantially equal.

The first angle and/or second angle may be between 5 degrees and 15 degrees, and/or 10 degrees or less or 5 degrees or less. The angle between the detection and illumination optical path at the scattering volume may be 10 degrees or less.

The illumination and detection optical path may lie in a common plane (or may not be in a common plane). The common plane may be horizontal or vertical (an opening of a sample cell may face upwards in an instrument, for obvious reasons).

The detection optical path and the illumination optical path may cross at a first location at a distance from the focus tuneable lens. The first location may be on the optical axis of the focus tuneable lens. The focus tuneable lens may be operable to have a focal length that co-locates a focal point of the focus tuneable lens with the first location.

The focus tuneable lens may be un-powered (or at a centre of an operating range of focal lengths) when the focal point is co-located with the first location. This may be advantageous because the focus tuneable lens may have more stability or linearity at or near a quiescent or central operating point.

A light source coupling lens may be arranged on the illumination optical path between the light source and the focus tuneable lens. A detector coupling lens may be arranged on the detection optical path between the detector and the focus tuneable lens. The light source coupling lens may be arranged to focus the illumination optical path on a principal plane of the focus tuneable lens. The detector coupling lens may be configured to focus the detection optical path on a principle plane (e.g. the same principle plane) of the focus tuneable lens.

A focusing lens may be provided between the focus tuneable lens and the sample (e.g. along the illumination and/or detection optical path). The focusing lens may comprise at least one fixed focal length lens.

The focusing lens may have a focal point on a principle plane of the focus tuneable lens. The focusing lens may have a further focal point within the sample cell (or sample). This arrangement means that the focusing lens images the scattering volume at the focus tuneable lens.

The apparatus may be configured such that moving the position of the scattering volume in the sample closer to the light source by changing the focal length of the focus tuneable lens results in a decrease in the scattering volume. Moving the position of the scattering volume in the sample further from the light source by changing the focal length of the focus tuneable lens may result in an increase in the scattering volume.

The adjustment of the volume of the detection region may result in better optimisation of the measurement parameters of the particle characterisation process. This can improve signal to noise ratio for samples with high and/or low particle concentrations. For turbid samples the detection region may be located near a sample cell wall and a small detection region used. For samples with a low particle concentration, the detection region may be located remote from the sample cell wall, and a relatively large detection region used. Adjustment of both the location and volume of the detection region facilitates improved optimisation of the measurement parameters, and enables significant improvements in the lowest and/or highest concentration of particles that can reliably be characterised.

The detection optical path and illumination optical path may be focused within the sample cell, or may be collimated within the sample cell, or may be between these conditions (e.g. with convergent illumination and detection paths within the sample cell but not coming to focus within the sample cell).

An illumination mirror may be provided between the focus tuneable lens and the sample, for directing the illumination optical path into the sample cell, and the illumination optical path may be arranged so as not to pass through the focus tuneable lens. The illumination mirror may direct the illumination optical path along an axis of the focus tuneable lens into the sample. This arrangement may make optical alignment more straightforward, because more optical components are aligned on a common axis, rather than at angles to each other.

The apparatus may further comprise a beam splitter configured to direct some of the illuminating light beam onto the detector to mix with the scattered light from the detection optical path. This enables heterodyne optical detection at the detector.

The beam splitter may conveniently be positioned at a point of intersection of the illumination optical path and detection optical path.

The apparatus may further comprise an actuator for moving/vibrating at least one optical element in the illumination optical path and/or detection optical path, so as to facilitate modulated heterodyne optical detection (by spatial light modulation of the illumination and/or detection optical path).

The apparatus may be configured to perform a zeta potential measurement.

The detection optical path may comprise a planar reflector, and an actuator may be configured to move the planar reflector substantially normal to the plane of the reflector so as to spatially modulate the detection optical path.

The focus tuneable lens may be operable to compensate for at least one of: a refractive index of the sample, an orientation of a sample cell within which the sample is held, a refractive index of the sample cell and the geometry of the sample cell.

The focus tuneable lens may be mounted on a translation stage.

The focus tuneable lens may comprise a deformable lens. The focus tuneable lens may comprise a material in which a refractive index may be varied by application of a stimulus. The focus tuneable lens may comprise an optical sub-assembly comprising more than one lens element, with at least one of the more than one lens element being moveable.

The focus tuneable lens may be arranged to collect at least one of: forward scattered light, back scattered light and side scattered light.

Forward scattered light may be defined as scattered light with a propagation direction at the scattering volume having a component in the direction of propagation of the light beam. Back scattered light may be defined as scattered light with a propagation direction at the scattering volume having a component in a direction opposite to the direction of propagation of the light beam. Side scattered may be defined as scattered light that propagates in a direction that is substantially perpendicular to the direction of propagation of the light beam.

The focus tuneable lens may be configured to vary the light beam width incident on the focusing lens.

The term "moveable lens" may refer to a lens mounted on a translation arrangement (or stage) for controllably repositioning the lens (for example, by rotating a lead screw).

The focusing lens may focus the detection optical path within the sample.

The illumination and/or detection optical path may comprise an optical fibre.

The optical fibre may comprise a single mode fibre.

The apparatus may further comprise a coupling lens arranged to couple the detection optical path to the optical fibre.

The coupling lens may comprise a graded refractive index lens.

The apparatus may be operable to perform a dynamic light scattering measurement using an output from the detector.

The apparatus may comprise a processor for performing the dynamic light scattering measurement. Performing a dynamic light scattering experiment may comprise performing a correlation operation on a time series of scattering intensity data obtained from the detector, and then processing the resulting correlogram to determine at least one of an average particle size (Zaverage) a polydispersity index (pdi) and a particle size distribution. Processing the correlogram may comprise using the well known cumulants technique, or may involve some other technique such as CONTIN, or non-negative least squares.

According to a second aspect, there is provided a particle characterisation apparatus comprising: a light source for illuminating a sample with a light beam; a detector arranged to detect scattered light from the interaction of the light beam with the sample; a focus tuneable lens arranged to collect the scattered light for the detector from a scattering volume and/or to direct the light beam into the sample; and a focusing reflector configured to direct at least one of the illumination path and detection path into the sample.

The apparatus may be configured so that varying the focal length of the focus tuneable lens changes the angle of intersection of the illumination and detection optical path within the sample without altering the position and/or size of the scattering volume.

The focusing reflector may be configured to direct the illumination optical path and detection optical path into the sample.

A focusing lens may be provided between the focus tuneable lens and the sample (e.g. along the illumination and/or detection optical path). The focusing lens may comprise at least one fixed focal length lens.

The focusing lens may have a focal point on a principle plane of the focus tuneable lens.

The scattering angle may be adjustable without translating a lens or lens element, which may make the apparatus more reliable, and/or may allow for rapid adjustment of the scattering angle.

The apparatus may comprise a sample cell, and/or a sample cell holder, for receiving the sample (e.g. in the sample cell).

The apparatus may comprise a detection optical path, by which the scattered light reaches the detector, and an illumination optical path, by which the light beam reaches the sample from the light source. Both the detection optical path and the illumination optical path may pass through the focus tuneable lens. In some embodiments only the detection optical path or only the detection optical path may pass through the focus tuneable lens.

The focus tuneable lens may have an optical axis. The detection optical path (e.g. on the detector side of the focus tuneable lens) may be at a first (non-zero) angle to the optical axis. The illumination optical path (e.g. on the light source side of the focus tuneable lens) may be at a second (non-zero) angle to the optical axis. The first angle and second angle may be substantially equal.

The first angle and/or second angle may be between 5 degrees and 15 degrees, and/or may 10 degrees or less or 5 degrees or less. The angle between the detection and illumination optical path at the scattering volume may be 10 degrees or less.

The illumination and detection optical path may lie in a common plane (or may not be in a common plane). The common plane may be horizontal or vertical (an opening of a sample cell may face upwards in an instrument, so that liquid does not fall through the opening).

The detection optical path and the illumination optical path may cross at a first location at a distance from the focus tuneable lens. The first location may be on the optical axis of the focus tuneable lens. The focus tuneable lens may be operable to have a focal length that co-locates a focal point of the focus tuneable lens with the first location.

The focus tuneable lens may be un-powered (or at a centre of an operating range of focal lengths) when the focal point is co-located with the first location. This may be advantageous because the focus tuneable lens may have more stability or linearity at or near a quiescent or central operating point.

A light source coupling lens may be arranged on the illumination optical path between the light source and the focus tuneable lens. A detector coupling lens may be arranged on the detection optical path between the detector and the focus tuneable lens. The light source coupling lens may be arranged to focus the illumination optical path on a principal plane of the focus tuneable lens. The detector coupling lens may be configured to focus the detection optical path on a principle plane (e.g. the same principle plane) of the focus tuneable lens.

A focusing lens may be provided between the focus tuneable lens and the sample (e.g. along the illumination and/or detection optical path). The focusing lens may comprise at least one fixed focal length lens.

The focusing lens may have a focal point on a principle plane of the focus tuneable lens. The focusing lens may have a further focal point within the sample cell (or sample). This arrangement means that the focusing lens images the scattering volume at the focus tuneable lens.

The apparatus may be configured such that decreasing the scattering angle by adjusting the focus tuneable lens results in a decrease in the scattering volume. Increasing the scattering angle by adjusting the focus tuneable lens may result in an increase in the scattering volume.

The detection optical path and illumination optical path may be focused within the sample cell, or may be collimated within the sample cell, or may be between these conditions (e.g. with convergent illumination and detection paths within the sample cell but not coming to focus within the sample cell).

An illumination mirror may be provided between the focus tuneable lens and the sample, for directing the illumination optical path into the sample cell, and the illumination optical path may be arranged so as not to pass through the focus tuneable lens. The illumination mirror may direct the illumination optical path along an axis of the focus tuneable lens into the sample. This arrangement may make optical alignment more straightforward, because more optical components are aligned on a common axis, rather than at angles to each other.

The apparatus may further comprise a beam splitter configured to direct some of the illuminating light beam onto the detector to mix with the scattered light from the detection optical path. This enables heterodyne optical detection at the detector.

The beam splitter may conveniently be positioned at a point of intersection of the illumination optical path and detection optical path.

The apparatus may further comprise an actuator for moving/vibrating at least one optical element in the illumination optical path and/or detection optical path, so as to facilitate modulated heterodyne optical detection (by spatial light modulation of the illumination and/or detection optical path).

The apparatus may be configured to perform a zeta potential measurement.

The detection optical path may comprise a planar reflector, and an actuator may be configured to move the planar reflector substantially normal to the plane of the reflector so as to spatially modulate the detection optical path.

The focus tuneable lens may be mounted on a translation stage.

The focus tuneable lens may comprise a deformable lens. The focus tuneable lens may comprise a material in which a refractive index may be varied by application of a stimulus. The focus tuneable lens may comprise an optical sub-assembly comprising more than one lens element, with at least one of the more than one lens element being moveable.

The focus tuneable lens may be arranged to collect at least one of forward scattered light, back scattered light and side scattered light.

The focus tuneable lens may be configured to vary the light beam position (and/or light beam width) incident on the focusing reflector.

The focusing reflector may focus the detection optical path within the sample.

The illumination and/or detection optical path may comprise an optical fibre. The optical fibre may comprise a single mode fibre. The apparatus may further comprise a coupling lens arranged to couple the detection optical path to the optical fibre. The coupling lens may comprise a graded refractive index lens.

The apparatus may be operable to perform a dynamic light scattering measurement using an output from the detector. The apparatus may be configured to perform a static light scattering measurement using an output from the detector.

The instrument may comprise a processor configured to perform a set of measurements, each at a different scattering angle, by controlling the focus tuneable lens, and then to determine a static light scattering measurement from the output from the detector for the set of measurements. The processor may be configured to use a Rayleigh or Mie scattering theory to relate the pattern of intensity of scattering at different scattering angle to a particle size or particle size distribution.

The apparatus may comprise a processor for performing the dynamic light scattering measurement. Performing a dynamic light scattering experiment may comprise performing a correlation operation on a time series of scattering intensity data obtained from the detector, and then processing the resulting correlogram to determine at least one of an average particle size (Zaverage) a polydispersity index (pdi) and a particle size distribution. Processing the correlogram may comprise using the well known cumulants technique, or may involve some other technique such as CONTIN, or non-negative least squares.

According to a third aspect of the invention, there is provided a particle characterisation apparatus comprising: a light source for illuminating a sample with a light beam; a detector arranged to detect scattered light from the interaction of the light beam with the sample; a focus tuneable lens arranged to collect the scattered light for the detector from a scattering volume and/or to direct the light beam into the sample, a sample holder with an opposed pair of electrodes and configured to hold a sample in position in a measurement volume between the pair of electrodes such that a planar surface of the sample is aligned orthogonally to the electrode surfaces, the planar surface adjacent to the scattering volume, wherein adjustment of the focus tuneable lens results in adjustment of the relative position of the planar surface and the scattering volume by moving the scattering volume (e.g. while the planar surface remains static).

This adjustment may occur without translating the light source, and/or without translating any optical elements in the illumination or detection optical path.

A focusing lens may be provided between the focus tuneable lens and the sample (e.g. along the illumination and/or detection optical path). The focusing lens may comprise at least one fixed focal length lens.

The focusing lens may have a focal point on a principle plane of the focus tuneable lens. This arrangement is an elegant way to achieve a constant scattering angle as the location of the scattering volume is adjusted.

The focusing lens may have a further focal point within the sample cell (or sample). This arrangement means that the focusing lens images the scattering volume at the focus tuneable lens.

The focus tuneable lens may comprise an illumination focus tuneable lens, configured to direct the light beam into the sample. A detection focus tuneable lens may be provided for collecting the scattered light for the detector. The apparatus may be configured to adjust the illumination and collection focus tuneable lens in tandem.

The location of the scattering volume may be adjustable without translating a lens or lens element, which may make the apparatus more reliable, and/or may allow for faster adjustment of the illumination and/or detection optical path.

The apparatus may comprise a detection optical path, by which the scattered light reaches the detector, and an illumination optical path, by which the light beam reaches the sample from the light source.

The focus tuneable lens may have an optical axis. The detection optical path (on the opposite side of the detection focus tuneable lens to the sample) may be at a first (non-zero) angle to the optical axis. The illumination optical path may be at a second (non-zero) angle to the optical axis (on the opposite side of the illumination focus tuneable lens to the sample). The first angle and second angle may be substantially equal.

The first angle and/or second angle may be between 5 degrees and 15 degrees, and/or may 10 degrees or less or 5 degrees or less. The angle between the detection and illumination optical path at the scattering volume may be 10 degrees or less.

The detection and illumination optical paths in the sample may both remain substantially parallel to the planar surface as the focus tuneable lens is adjusted.

The illumination and detection optical paths may lie a different plane. The angle between the different planes of the illumination and detection optical paths may define the scattering angle.

A light source coupling lens may be arranged on the illumination optical path between the light source and the focus tuneable lens. A detector coupling lens may be arranged on the detection optical path between the detector and the focus tuneable lens. The light source coupling lens may be arranged to focus the illumination optical path on a principal plane of the focus tuneable lens. The detector coupling lens may be configured to focus the detection optical path on a principle plane (e.g. the same principle plane) of the focus tuneable lens.

A focusing lens may be provided between the focus tuneable lens and the sample (e.g. along the illumination and/or detection optical path). The focusing lens may comprise at least one fixed focal length lens.

The focusing lens may have a focal point on a principle plane of the focus tuneable lens. The focusing lens may have a further focal point within the sample cell (or sample). This arrangement means that the focusing lens images the scattering volume at the focus tuneable lens.

The apparatus may be configured such that moving the position of the scattering volume in the sample closer to the planar surface by changing the focal length of the focus tuneable lens results in an increase in the scattering volume. Moving the position of the scattering volume in the sample further from the planar surface by changing the focal length of the focus tuneable lens may result in an decrease in the scattering volume. In some embodiments, moving the scattering volume further from the planar surface may result in an increase in the scattering volume (and moving the scattering volume close to the planar surface may result in a decrease in the scattering volume).

The adjustment of the volume of the detection region may result in better optimisation of the measurement parameters of the particle characterisation process.

The detection optical path and illumination optical path may be focused within the sample cell, or may be collimated within the sample cell, or may be between these conditions (e.g. with convergent illumination and detection paths within the sample cell but not coming to focus within the sample cell).

The apparatus may further comprise a beam splitter configured to direct some of the illuminating light beam onto the detector to mix with the scattered light from the detection optical path. This enables heterodyne optical detection at the detector.

The apparatus may further comprise an actuator for moving/vibrating at least one optical element in the illumination optical path and/or detection optical path, so as to facilitate modulated heterodyne optical detection (by spatial light modulation of the illumination and/or detection optical path).

The apparatus may be configured to perform a zeta potential measurement.

The detection optical path may comprise a planar reflector, and an actuator may be configured to move the planar reflector substantially normal to the plane of the detector so as to spatially modulate the detection optical path.

The focus tuneable lens may be operable to compensate for at least one of: a refractive index of the sample, an orientation of a sample cell within which the sample is held, a refractive index of the sample cell and the geometry of the sample cell.

The focus tuneable lens may be mounted on a translation stage.

The focus tuneable lens may comprise a deformable lens. The focus tuneable lens may comprise a material in which a refractive index may be varied by application of a stimulus. The focus tuneable lens may comprise an optical subassembly comprising more than one lens element, with at least one of the more than one lens element being moveable.

The focus tuneable lens may be arranged to collect at least one of forward scattered light, back scattered light and side scattered light.

The focus tuneable lens may be configured to vary the light beam width incident on the focusing lens.

The focusing lens may focus the detection optical path within the sample.

The illumination and/or detection optical path may comprise an optical fibre. The optical fibre may comprise a single mode fibre. The apparatus may further comprise a coupling lens arranged to couple the detection optical path to the optical fibre. The coupling lens may comprise a graded refractive index lens.

The apparatus may be operable to perform a dynamic light scattering measurement using an output from the detector.

The apparatus may comprise a processor for performing the dynamic light scattering measurement. Performing a dynamic light scattering experiment may comprise performing a correlation operation on a time series of scattering intensity data obtained from the detector, and then processing the resulting correlogram to determine at least one of an average particle size (Zaverage) a polydispersity index (pdi) and a particle size distribution. Processing the correlogram may comprise using the well known cumulants technique, or may involve some other technique such as CONTIN, or non-negative least squares.

According to a fourth aspect, there is provided a method of performing a dynamic or static light scattering measurement, comprising:

illuminating the sample with a light beam, thereby producing scattered light by the interaction of the light beam with the sample;

detecting scattered light along a detection optical path that intersects the light beam within the sample at a detection region, thereby obtaining data;

adjusting at least one of a location of the detection region, a volume of the detection region, or an angle between the illumination and detection optical path at the detection region, by changing the focal length of a focus tuneable lens in at least one of the illumination and detection optical path;

repeating, at least once, the step of detecting scattered light after performing at least one corresponding step of adjustment by changing the focal length of the focus tuneable lens;

performing a static or dynamic light scattering measurement using the data obtained from at least one focal length of the focus tuneable lens.

The method may comprise performing a dynamic light scattering measurement in which each adjusting step changes at least a position of the detection region, and each adjusting step is in response to measurement data corresponding with a preceding adjustment step. This approach may be used to determine an optimal measurement location for a dynamic light scattering measurement—for a turbid sample the optimal location may be near to the sample cell wall, and for a low concentration sample the optimal location may be near to the centre of the sample cell. The average count rate of the measurement data is one way to determine an appropriate measurement location. The intercept of a correlogram produced from the measurement data may alternatively or additionally be used to determine an appropriate measurement location.

The method may comprise performing a dynamic or static light scattering measurement by obtaining measurement data from a plurality of scattering angles by adjusting the focal length of the focus tuneable lens. Multi-angle static light scattering measurements and dynamic light scattering measurement are well known in the art of particle characterisation, but these are normally obtained by physically translating optical components (e.g. the light source), or by using multiple detectors at different angles. Using a focus tuneable lens to select different measurement angles enables a faster adjustment time, and may reduce costs and simplify construction (e.g. by avoiding a translation stage and/or multiple detectors at different angles).

The method may further comprise providing an estimated concentration of particles within the sample cell.

The estimated concentration may comprise a qualitative indicator of concentration.

The method may further comprise measuring the concentration of particles within the sample.

Apparatus according to any aspect may be configured to perform a plurality of dynamic light scattering measurements at varying distances from a wall (e.g. of a sample cell). A processor may be used to characterise hindered diffusion effects in the vicinity of the wall.

Features of any aspect may be combined with features of any other aspect. The method of any aspect or embodiment may be performed with an apparatus of the first or second aspect, in accordance with the features thereof. Apparatus according to any aspect may be configured to perform the method of the fourth aspect, including any of the optional features thereof.

Any aspect that includes a focus tuneable lens may alternatively be implemented with a moving lens arrangement. For example, the focus tuneable lens mentioned in the fourth aspect may be replaced with a moveable lens (i.e. a lens and translation stage), similar to that described in relation to the second aspect.

BRIEF DESCRIPTION OF THE DRAWINGS

Embodiments of the invention will now be described, with reference to the accompanying drawings, in which.

DETAILED DESCRIPTION OF THE INVENTION

Figure 1:
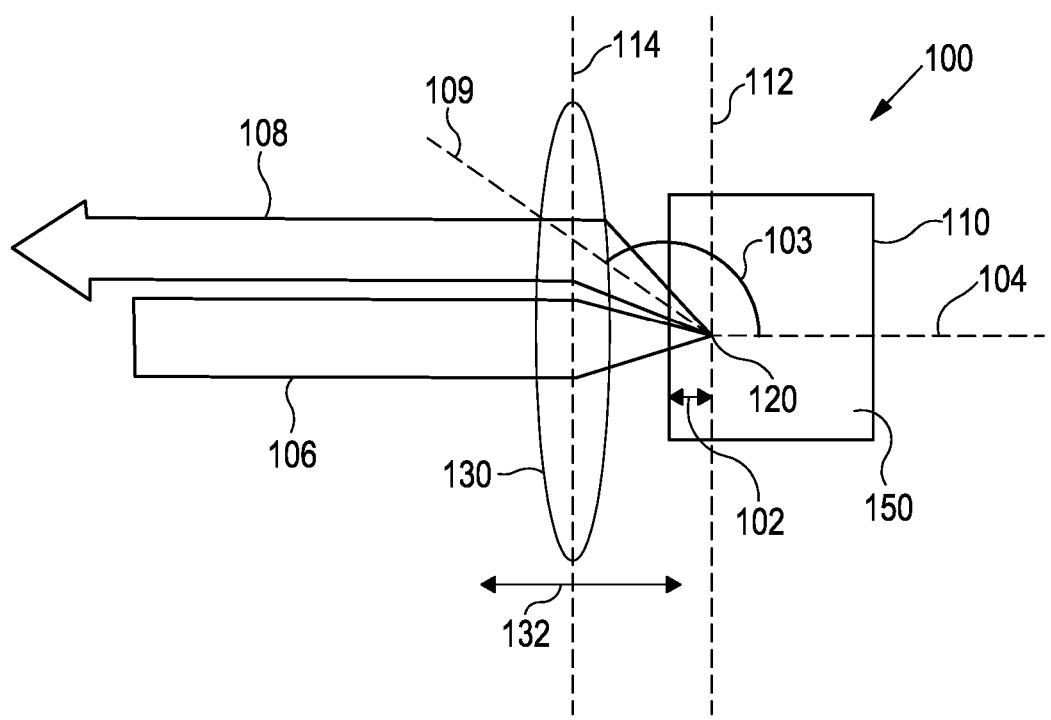
FIG. 1 is a schematic diagram of a prior art NIBS arrangement with the detection region in a first position.
Figure 2:
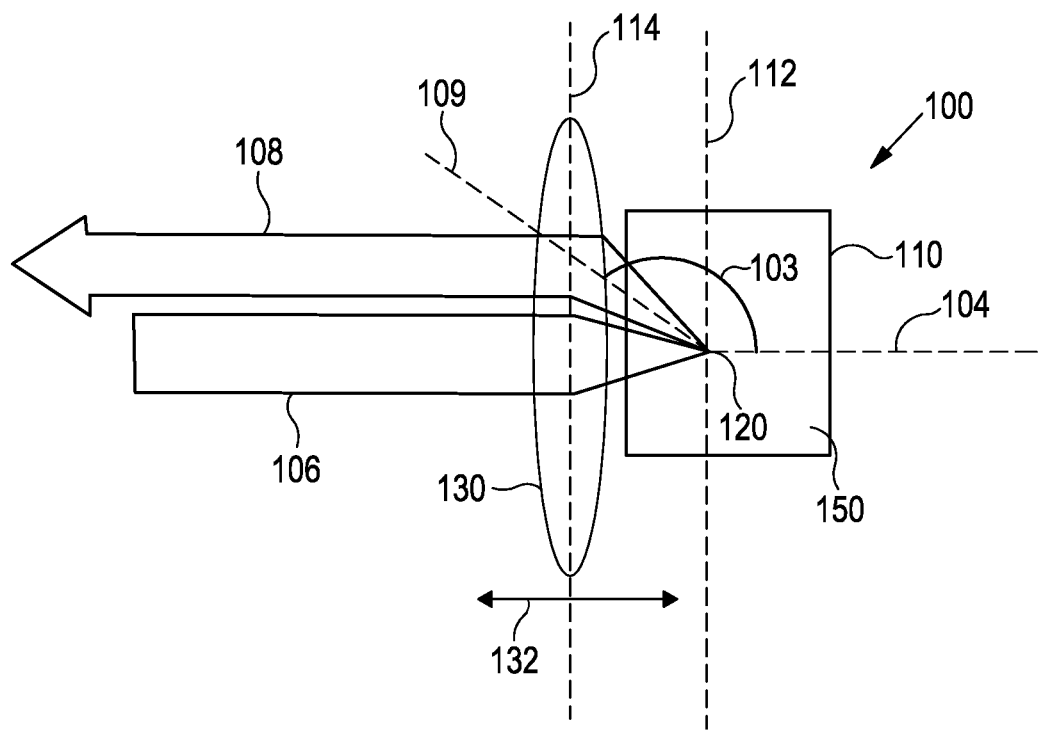
FIG. 2 is a schematic diagram of a prior art NIBS arrangement with the detection region in a second position.

Referring to FIGS. 1 and 2, a prior art NIBS arrangement 100 is shown, in which an illumination beam 106 is focused on a sample 150 within a sample cell 110 by a focusing lens 130.

A detection optical path 108 receives light scattered from the illumination beam 106 by particles dispersed within the sample 150. The detection optical path 108 defines the field of view of a detector (not shown) for detecting the scattered light. The detection optical path 108 may receive light scattered at a narrow range of angles, centred on a specific scattering angle 103 along detection axis 109. The detection optical path 108 is also focused within the sample 150 by the focusing lens 130.

The intersection of the illumination beam 106 and the detection optical path 108 define a detection region 120. The position of the detection region 120 within the sample cell 110 can be varied by moving the focusing lens 130, which varies the position of a focal plane 112 of the focusing lens 130 within the sample cell 110. As the focusing lens moves closer to the sample cell, the detection volume moves in the same direction, increasing a distance 102 between the detection region 120 and a cell wall through which the light beam 106 passes to illuminate the sample 150. In FIG. 1 the detection volume 120 is positioned closer to this wall of the sample cell 110 than is the case in FIG. 2.

As discussed above, this arrangement provides for adjustment of the position of the detection region 120, but does not enable adjustment of the volume of the detection region 120.

WO2016/0349902 discloses arrangements with a beam expander to vary the width of the illuminating light beam incident on the focusing lens. An increased beam diameter incident on the focusing lens results in a narrower waist of focus at the focal plane within the sample. Conversely, a narrower beam diameter incident on the focusing lens results in a broader waist of focus within the focal plane within the sample. A narrower waist of focus equates to a smaller detection region, and broader waist equates to a larger detection region.

A narrow beam waist is particularly suitable for characterisation of turbid samples with high concentration of particles. A detection region with a smaller volume may be positioned closer to a wall of the sample cell, reducing the probability of multiple scattering, which directly results in an increase in the maximum particle concentration that can be reliably characterised by the instrument. For a sample with a low concentration of particles, the size of the detection region may be increased by moving the moveable lens further away from the fixed lens, thereby increasing the beam width at the focusing lens.

Figure 3:
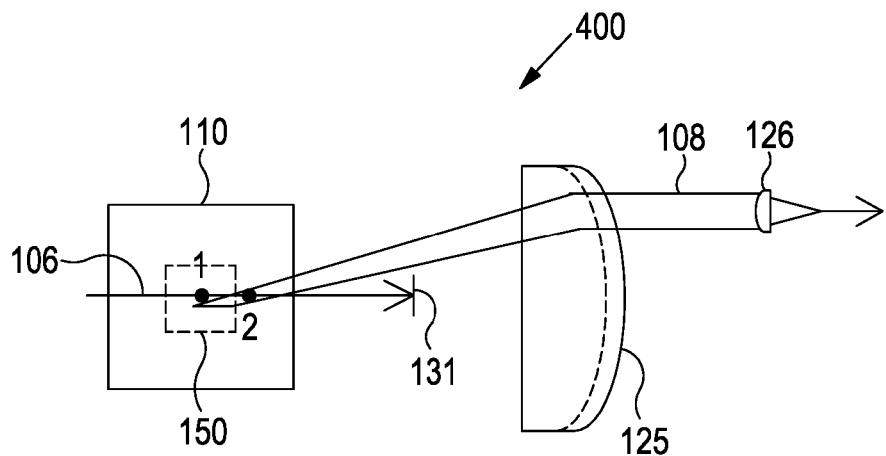
FIG. 3 is a schematic of a forward scatter detection arrangement employing a focus adjustable lens.

FIG. 3 shows a detection arrangement 400 comprising a focus tuneable lens 125 (which may be a deformable lens). The illumination beam optical path 106 is incident on the sample 150 (within the sample cell 110), and light is scattered from the sample 150. After passing through the sample 150, the illumination beam is trapped at beam dump 131. Scattered light is detected in forward scatter in the example of FIG. 3. The detection optical path 108 passes through the focus tuneable lens 125, which is operable to adjust a position of the detection region within the sample 150. A fixed coupling lens 126 (e.g. a GRIN lens) may be provided to couple the detection path 108 to an optical fibre (not shown) which carries the scattered light to a detector element (e.g. photodiode).

Figure 4:
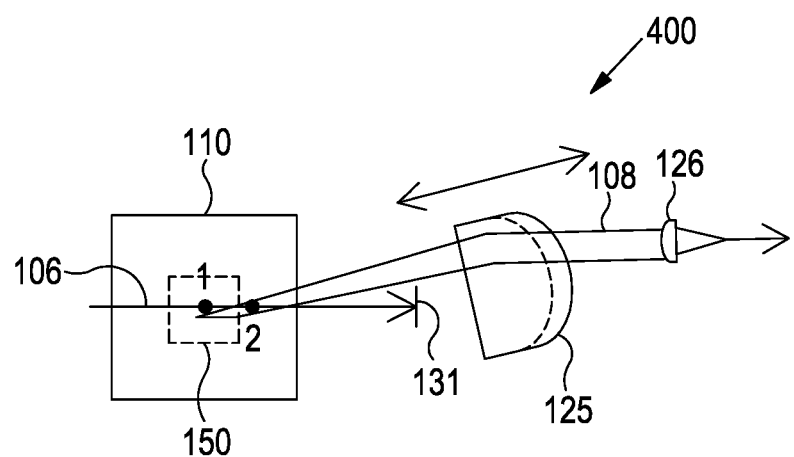
FIG. 4 is a schematic of a forward scatter detection arrangement employing a focus adjustable lens on a translation stage.

FIG. 4 illustrates a further detection arrangement 400 that includes all the features of the embodiment of FIG. 3, with the exception that the focus tuneable lens 125 is mounted on a translation assembly, so that it can be moved along the detection optical path 108 to vary the distance between the sample cell 110 and the focus tuneable lens 125.

Figure 5:
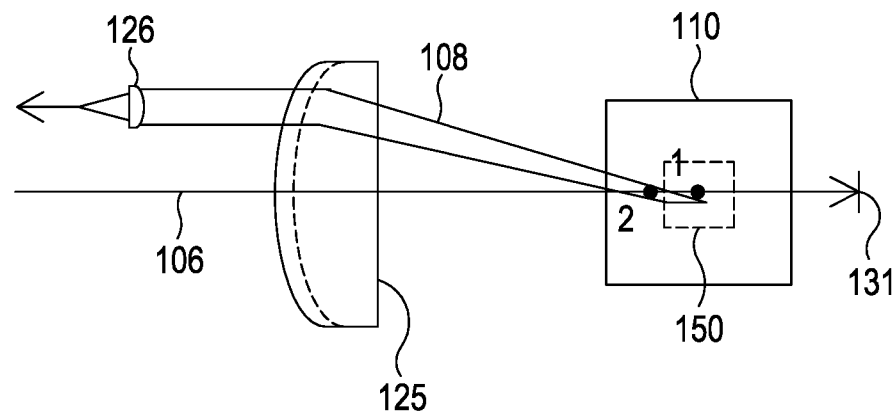
FIG. 5 is a schematic of a back scatter detection arrangement employing a focus adjustable lens.

FIG. 5 illustrates an embodiment in which the illumination optical path 106 and the detection optical path 108 both pass through the focus tuneable lens 125. The illumination optical path 106 is substantially coincident with an optical axis of the focus tuneable lens 125. The detection optical path 108 is a backscatter detection path that passes through the focus tuneable lens 125 at an angle to the illumination optical path 106. Again, adjustment of the focal length of the focus tuneable lens 125 results in a change in the position of the detection region within the sample (e.g. between position 1 and position 2). The volume of the detection region may also change with adjustment of the position of the detection region, as a result of the change in the effective scattering angle of the detection optical path 108.

For instruments that seek to provide a large range of measurement types, for instance with a range of cell and sample type, concentration etc., it may be advantageous to be able to vary the intersection overlap geometry between the scattering volume and illuminating light beam and the location of the scattering volume within the sample.

At present, forward scattered light collection may require compensation for the difference in intersection location which occurs with different sample refractive index and different sample cell materials and geometries. It is known to compensate for such factors via a number of discrete optical flats of different thicknesses within an accessory wheel. This means a limited number of conditions can be compensated for, and there will be some level of variability in the compensation, due to tolerances in the optical flats and variations in assembly thereof. Present arrangements may also require a translation stage which may move an optical element of the collection optics. These components are presently bulky, which make it increasingly difficult to squeeze in additional capability around the cell area. By contrast, the approach of using a focus tuneable lens enables a more elegant approach, which may involve a relatively compact, single component.

A focus tuneable lens 125 may be arranged to perform cell compensation for forward scattered light, and for collecting back scattered light (for example in a non-invasive back scattered light detection arrangement). Other examples are also envisaged (for example the adjustment of alternative scatter angles e.g. light scattered at 90 degrees to the illuminating light).

In FIGS. 3 to 5 intersection point '1' shows a focus tuneable lens condition that is set up to position the scattering volume at the centre of a sample cell 110 (the sample cell may be a standard 10 mm or 12 mm sample cell).

The focus tuneable lens 125 may be deformed to correct for a different cell arrangement (for example a smaller cell), or to place the scattering region nearer to (or at) the centre of a sample cell 110. This deformed configuration adjusts the location of the scattering volume to intersection point '2' by altering the focusing power from the focus tuneable lens 125. In some embodiments the focus tuneable lens 125 may not be deformed in order to adjust focus, but instead the refractive index of the lens material may be varied.

Other advantages of embodiments may include:

A possible reduction in standoff and allowing a more "linear" optical arrangement. If the illumination beam 106 can be effectively dumped, detection closer to the illumination axis (reduced scatter angle) may be possible.

Also different refractive indices can be continually adjusted for, opening prospects for different cell orientations, with less concern for adjustment (e.g. replicated for a 90 degree, but tilted cell arrangement).

Characterisation of the focus adjustable lens 125 and cell 110 may mean that refractive index could be back-calculated based on drive current applied to control the focus adjustable lens.

A symmetrical arrangement (exploiting common parts in forward and backscatter) may be advantageous. Focus adjustable lenses 125 may have a wide focus range, making a common type of focus adjustable lens applicable to collection of forward and back scattered light.

A level of "auto-alignment" of a system would be made possible

The focus adjustable lens 125 may be positioned at a distance from the sample cell 110 that is close to its minimum available stand-off range. The distance from the focus adjustable lens 125 to the sample cell 110 may be less than 40 mm, 30 mm, 20 mm, or 10 mm). This has several advantages in enabling a miniaturised optical arrangement.

The focus tuneable lens 125 may be provided on a translation assembly (as illustrated in FIG. 4). Providing the focus adjustable lens 125 on a translation assembly allows the intersection volume to be tailored according to the particular demands of a measurement. For example, some measurements (e.g. in small cells that may be used for characterising samples with a high concentration of particles) would benefit from having a faster optics (tighter focus and collimated range), whilst others (e.g. at low concentration) might benefit from having a larger, broader intersection point at lower angle.

Some focus adjustable lenses have considerable imaging "coma". The applicant has found that such imaging "coma" may not substantially affect beam quality, compared with presently used solid singlet lens arrangements. Initial assessment of degradation in the back-propagating mode of collection that may occur for rays off-axis from the lens in some embodiments have also been promising.

The focus adjustable lens 125 may be used with a wedge optical element mounted on a translation stage. The wedge optical element may be on the same optical path (e.g. detection and/or illumination) as the focus adjustable lens 125. The adjustable wedge arrangement may be used to provide a continuous range of translation of the scattering volume without affecting the scattering angles.

The large range of focus travel for the some focus adjustable lenses is advantageous for future proofing designs.

Examples of a suitable focus tuneable lenses may be found at http://www.optotune.com/publication-2.

A range of alternative optical arrangements are envisaged, and these embodiments are merely illustrative. A deformable lens may provide additional degrees of freedom compared to previously known arrangements in which a translating lens is used. A focus tuneable lens improves the provision of a range of measurement intersection geometries and locations. The measurement intersection geometries and locations may be controlled under a single drive control, and may be controlled by a user via software.

Figure 6:
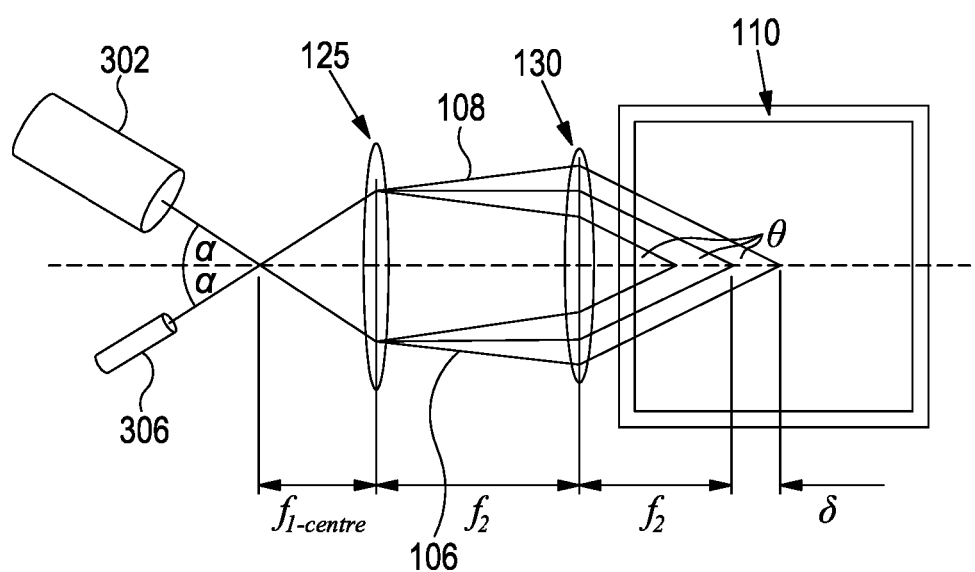
FIGS. 6 and 7 are schematics of a back scatter detection embodiment employing a focus adjustable lens in which symmetric detection and illumination optical paths are used, in accordance with a first aspect.
Figure 7:
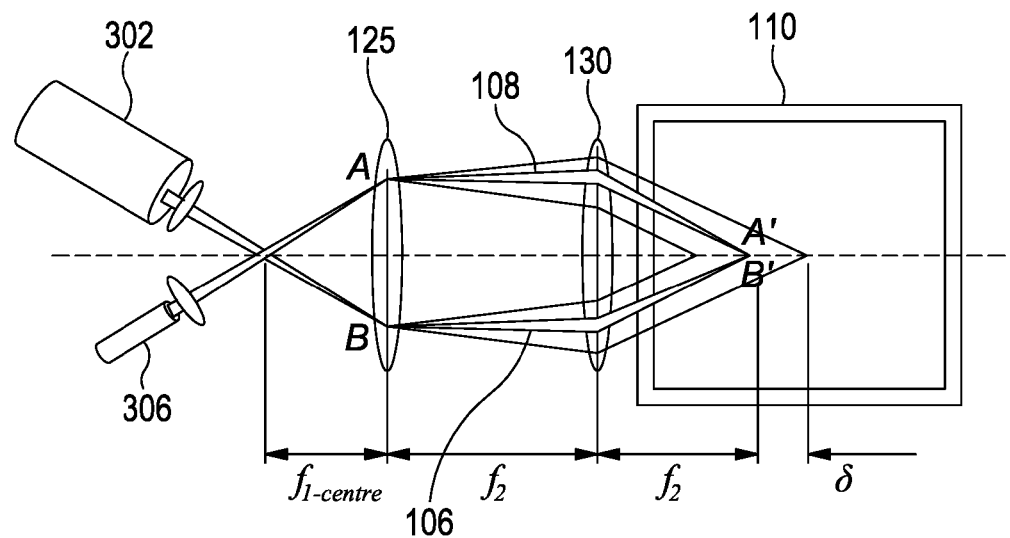

FIGS. 6 and 7 show an apparatus for particle characterisation, comprising: a light source 302, detector 306, focus tuneable lens 125, focusing lens 130, and sample cell 110. The light source 302 is configured to illuminate the interior of the sample cell 110 with a light beam along an illumination optical path 106. The particles in the sample will scatter the illumination light beam, to produce scattered light. The detector 306 is configured to receive this scattered light along a detection path 108.

The sample cell 110 is for housing a sample (which may comprise particles suspended in a diluent medium such as water or air). The light source 302 may comprise an optical fibre that is optically coupled to a laser source. An illumination coupling lens (shown in FIG. 7) may be provided for focusing light from the light source 302 (e.g. from a fibre) onto the illumination optical path 106 at point B. The detector 306 may comprise an optical fibre that is coupled to a detection element. A detection coupling lens (shown in FIG. 7) may be provided for collecting light onto the detector 306 (e.g. coupling to a detector fibre) from a focal point A on the detection optical path 108.

The detection optical path 108 and the illumination optical path 106 are both incident on the focus tuneable lens 125 at an angle to the optical axis thereof. Each of the detection and illumination optical path 108, 106 may be at the same angle α to the optical axis. In some embodiments the optical axis of the focus tuneable lens 125, the detection optical path 108 and the illumination optical path 106 may all lie in the same plane, but this is not essential (although it may be convenient). The plane may be vertical or horizontal. The detection optical path 108 and the illumination optical path 106 may each cross the optical axis of the focus tuneable lens 125 at the back focal distance (f1-centre) of the focus tuneable lens.

The focusing lens 130 may be a fixed focal length lens, arranged to focus the illumination and detection optical paths 106, 108 within the sample cell 110 on a detection region. The optical axes of the focus tuneable lens 125 and focusing lens 130 may be coincident.

Altering the focal length of the focus tuneable lens 125 varies the position that the illumination optical path 106 and the detection optical path 108 strike the focusing lens 130. The focus tuneable lens 125 may be placed on a back focal plane of the focusing lens 130, resulting in illumination and detection paths 106, 108 that vary in positon along the optical axis of the focusing lens 130, but meet at the same detection angle θ, regardless of the focal length of the focus tuneable lens 125. This means that control of the focal length of the focus tuneable lens 125 results in a variable measurement position in the sample cell 110 at a fixed detection angle, θ.

Further, the focusing lens 130 is configured to place a conjugate image of A (the detection beam spot in the plane of the focus tuneable lens 125), at A' (within the sample cell 110) and similarly to place a conjugate image of B (the illumination beam spot in the plane of the focus tuneable lens 125) at B' (within the sample cell 110). Therefore, regardless of which path from the focus tuneable lens 125 to the optical axis is taken through the focusing lens 130, the illumination and detection paths 106, 108 will both vary in an identical manner and remain matched in size. This may be an important advantage when dealing with the number of detected coherence areas.

The symmetrical illumination of the focus tuneable lens 125 and focusing lens 130 on either side of their common optical axis ensures that the illumination and detection optical-path spot sizes are matched along the optical axis, in the sample, and that as the cross-over of illumination and detection paths moves along the optical axis, the detection angle within the sample remains constant.

The spot size will change as the focal length of the focus tuneable lens 125 is changed (varying δ), resulting in a corresponding change in the volume of the detection region. In some embodiments it may be advantageous if the smallest spot (and hence detection region) occurs at the position closest to the cell wall (which may correspond with a shorter focal length), as this minimises the distance between the cell wall and the detector, with advantages for concentrated samples (multiple scattering events are reduced). The detection angle θ can be any physically realisable angle but, θ<10 degrees may be advantageous as it is over this range of angles that multiply scattered light is known to have a similar relaxation time to singly scattered light, with additional advantages for samples with relatively high concentration.

Figure 8:
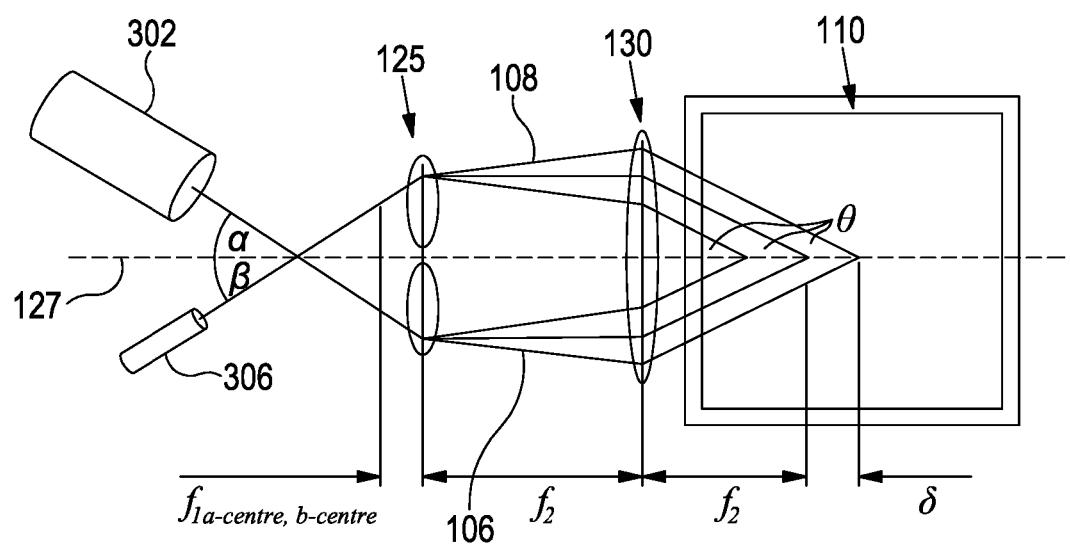
FIG. 8 is a schematic of a back scatter detection embodiment of the first aspect employing a focus adjustable lens in which non-symmetric detection and illumination optical paths are used, with first and second focus tuneable lens elements.

FIG. 8 illustrates an alternative embodiment, similar to that of FIG. 7, but in which the illumination and detection optical paths 106, 108 are not at the same angle to the optical axis of the focusing lens 130 (on the detector and light source side of the focus tuneable lens 125 respectively). In this embodiment, the illumination optical path 106 is at an angle α to the axis of the focusing lens 130, and the detection optical path is at a different angle β to the axis of the focusing lens 130. In this example the focus tuneable lens 125 comprises a first tuneable lens element on the illumination optical path 106 and a second tuneable lens element on the detection optical path 108. Each focus tuneable lens element may be arranged such that the illumination and detection optical path respectively crosses the lens element axis at the back focal distance (f1a-centre and f1b-centre respectively) of the corresponding focus tuneable lens. This arrangement results in a constant scattering angle θ as the position of the scattering volume in the sample is varied by adjusting the focal length of the focus tuneable lens 125.

Figure 9:
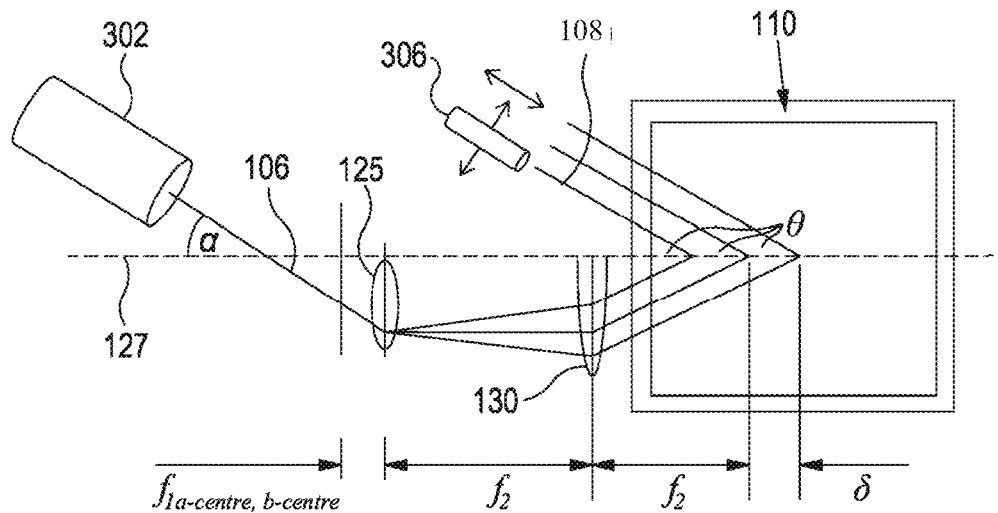
FIG. 9 is a schematic of a back scatter detection embodiment of the first aspect employing a focus adjustable lens in which non-symmetric detection and illumination optical paths are used, and a moveable detector is employed.

FIG. 9 shows a further alternative embodiment in which the detector 306 is moveable, and directly receives scattered light from the sample cell 110, without the scattered light passing through the focusing lens 130 or focus tuneable lens 125. The detector 306 may be moveable transverse to the scattered light to track the changing position of the illumination beam in the sample as the focal length of the focus tuneable lens 125 is varied, and/or may be moveable longitudinally, for example to vary a focal spot size in the sample cell.

Figure 10:
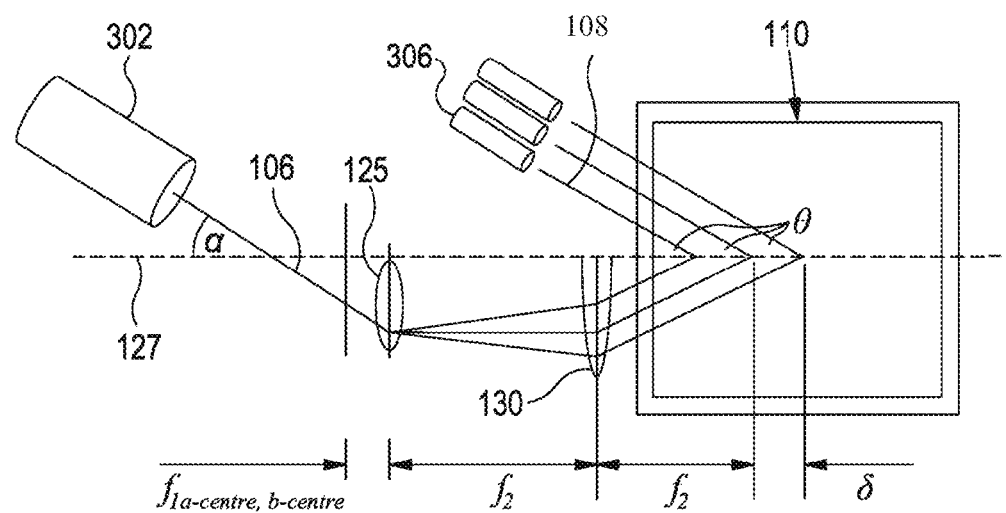
FIG. 10 is a schematic of a back scatter detection embodiment of the first aspect employing a focus adjustable lens in which non-symmetric detection and illumination optical paths are used, and plurality of detector fibres is employed.

FIG. 10 shows a further alternative embodiment in which the detector 306 comprises a plurality of detector fibres, arranged to receive light scattered from different locations within the sample, as a result of adjustment of the focus tuneable lens.

Figure 11:
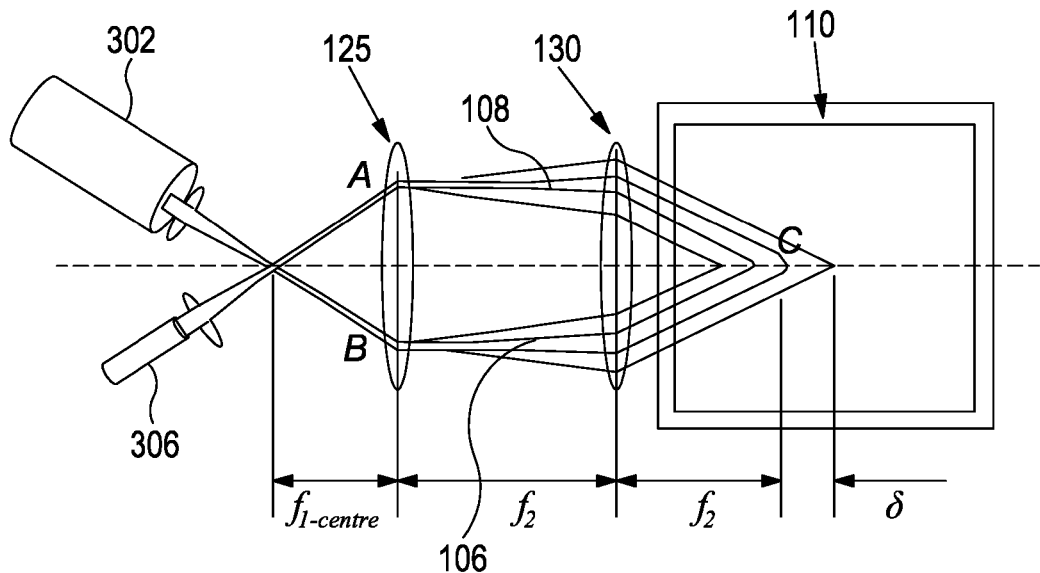
FIG. 11 is a schematic of a back scatter detection embodiment of the first aspect employing a focus adjustable lens in which symmetric detection and backscatter optical paths are used, and the illumination and detection beams are collimated in the sample.
Figure 12:
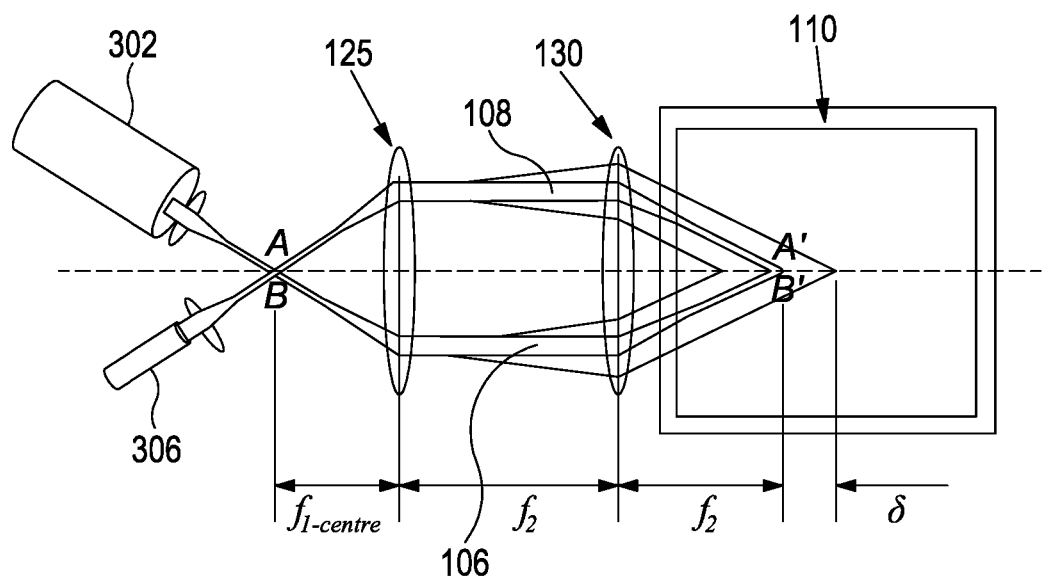
FIG. 12 is a schematic of a back scatter detection embodiment employing a focus adjustable lens in which a symmetric detection and backscatter optical path is used, and the illumination and detection beams are focused in the sample.

The focus tuneable lens 125 and focusing lens 130 may be configured to collimate the illumination and detection optical paths 106, 108 in the sample (e.g. at C), as illustrated in FIG. 11, which otherwise has all the features of FIG. 7. In the arrangement of FIGS. 7 and 12 the detection and illumination beams are focused (rather than collimated) in the sample by the focusing lens 130.

Figure 13:
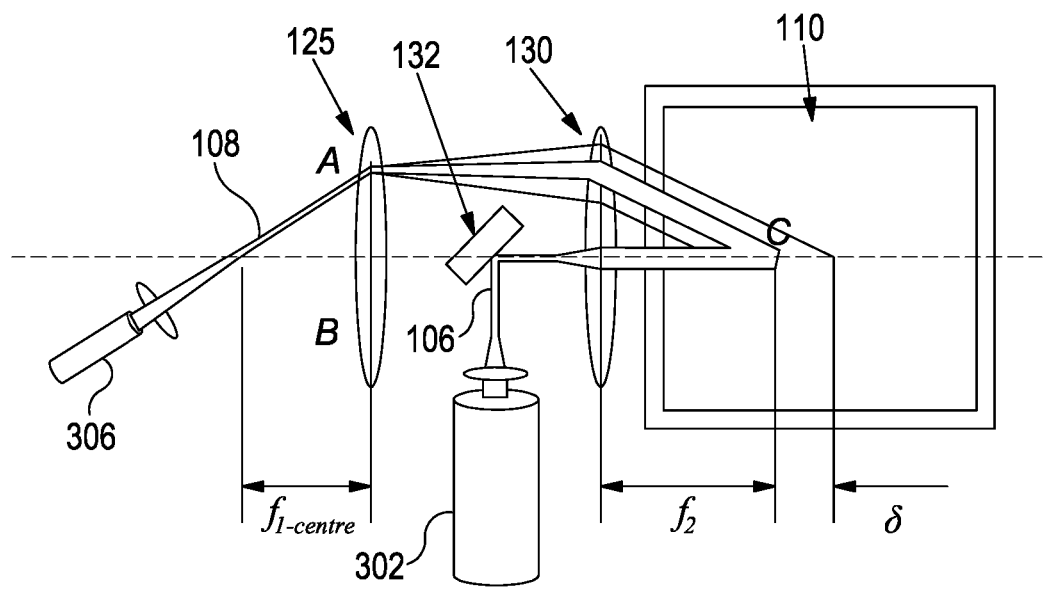
FIG. 13 is a schematic of a back scatter detection embodiment in which the illumination optical path is not symmetric with the detection optical path.

FIG. 13 illustrates an alternative backscatter detection arrangement in accordance with an embodiment, in which the detection optical path 108 has all the features described with reference to FIG. 11. The detection arrangement comprises a detector 306, focus tuneable lens 125, focusing lens 130, sample cell 110, light source 302, and illumination mirror 132.

Figure 15:
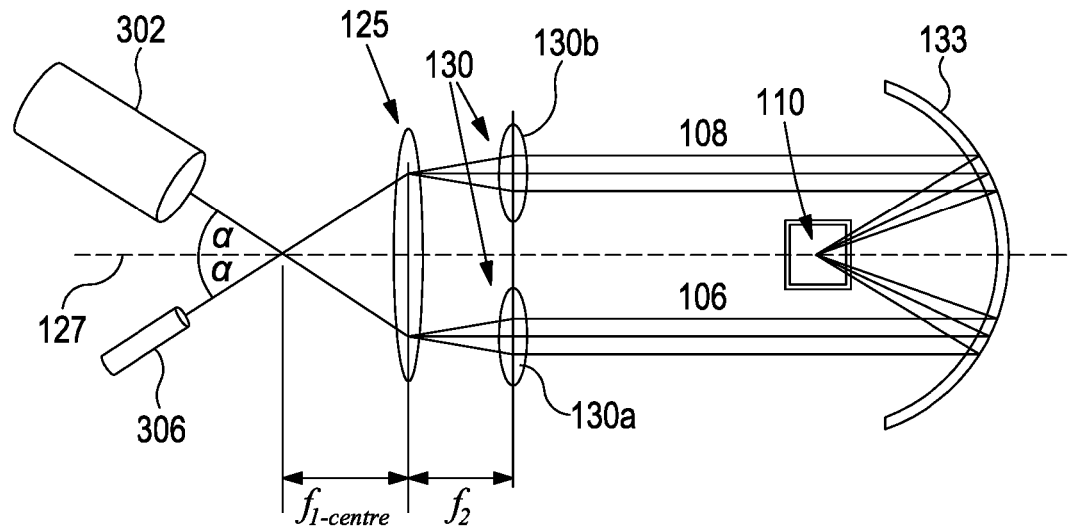
FIG. 15 is a schematic of a backscatter detection embodiment of the second aspect employing a curved reflector (e.g. mirror) to direct the illumination and detection optical paths into the sample carrier.

The detector 306 comprises an optical fibre, and detects light scattering from the sample (as a result of illumination along the illumination optical path 106). A fibre coupling lens is provided to couple the detection optical path 108 to the detector fibre. The detection optical path 108 comes from the sample cell 110, through the focusing lens 130, through the focus tuneable lens 125, through the fibre coupling lens and into the detector fibre 306. The illumination optical path 106 does not pass through the focus tuneable lens 125, but is instead directed through the focusing lens 130 (e.g. along the axis of the focusing lens) by an illumination mirror 132. In the arrangement of FIG. 15 the illumination and detection paths are illustrated as collimated in the sample cell 110, but this does not have to be the case—they may be focused within the sample cell 110 instead. Using a separate illumination optical path may simplify alignment of the detection arrangement: it may be easier to align more optical elements along a common axis.

Figure 14:
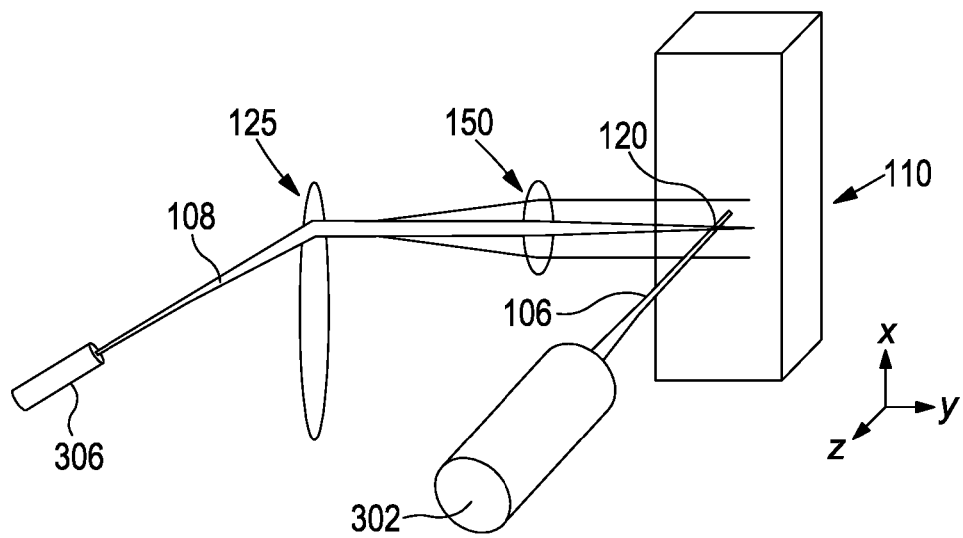
FIG. 14 is a schematic of a side scatter detection embodiment with a variable focal length lens.

FIG. 14 illustrates a side-scatter detection arrangement, in which the illumination and detection optical paths 106, 108 are at 90 degrees to each other in the sample cell 110. The detection optical path 108 passes through a focus tuneable lens 125 and a focusing lens 130, and is focused in the sample cell 110 (although in another embodiment it could alternatively be collimated by the focusing lens 130 in the sample cell 110). The illumination optical path 106 may be focused or collimated in the sample cell 110 by one or more lenses (not shown). The one or more lenses may comprise a fixed focal length or a focus tuneable lens.

In a side-scatter detection configuration the detection region at the overlap of the illumination optical path 106 and the detection optical path 108 tends to be very small (e.g. less than 100 μm in extent) and can therefore be sensitive to pointing stability in the light source (e.g. laser) and to optical alignment variation in the optical bed (that holds the optical elements in relative alignment), particularly in the x-direction (as shown), due to shipping, thermal variation, etc.

The focus tuneable lens 125 may be used to compensate (in at least 1 degree of freedom) for any such optical misalignment. There are cases where a collimated beam, rather than a focused system, may be beneficial, for example for high scattering applications (e.g. turbid samples). In the example shown in FIG. 14, adjustment of the focal length of the focus tuneable lens 125 results in adjustment in x (i.e. vertical) of the detection optical path (in the sample cell 110, relative to the illumination optical path 106). In an alternative embodiment, the focus tuneable lens 125 may be configured to compensate in the z direction, parallel with the illumination optical path in the sample cell (e.g. with a detection optical path 108 in a horizontal plane instead of a vertical plane) or y direction, or may be configured for compound adjustment (of at least one of an x, y, or z position), e.g. using an focus adjustable cylindrical lens, and/or a detection optical path 108 at a compound angle to the illumination optical path 106.

A similar arrangement to FIG. 14 may be used to investigate hindered diffusion, in which both the illumination and detection optical paths have the same elements that are described with reference to the detection optical path.

FIG. 15 shows a back scatter detection arrangement with a symmetric detection and illumination optical path 108, 106. The detection arrangement shown comprises a light source 302, detector 306, focus tuneable lens 125, focusing lenses 130, focusing reflector/mirror 133 and sample cell 110. Each of the detection and illumination optical path 108, 106 is at the same angle α to the axis of the focus tuneable lens 125 at incidence therewith. Conveniently, the detection and illumination optical paths may lie in the same plane (e.g. a horizontal or a vertical plane). In this embodiment the focusing lens 130 comprises an illumination focusing lens 130a and a detection focusing lens 130b. The focusing lens 130 directs the illumination and detection optical path 106, 108 onto the (curved) focusing mirror 133, which re-directs the illumination and detection paths 106, 108 to a detection region within the sample cell 110 (e.g. in a collimated or focused beam). In this embodiment, the position of the detection region is not changed when the focal length of the focus adjustable lens 125 is varied. Instead the angle between the illumination optical path 106 and the detection optical path 108 within the sample is changed. When the focal length of the focus adjustable lens 125 is increased, the angle between the illumination optical path 106 and detection optical path 108 in the sample cell 110 is increased (and the converse is true).

In another embodiment the focusing mirror 133 may be replaced with a further focusing lens, placed between the focusing lens 130 and the sample cell 110.

Embodiments that allow adjustment of the scattering angle (i.e. the angle between the illumination and detection optical path at the scattering volume) may be used to perform a static light scattering measurement at a plurality of measurement angles. In some embodiments a variable wavelength light source may be used, so that both wavelength and scattering angle θ can be varied (thereby enabling greater range of adjustment of the 'q' vector).

Figure 16:
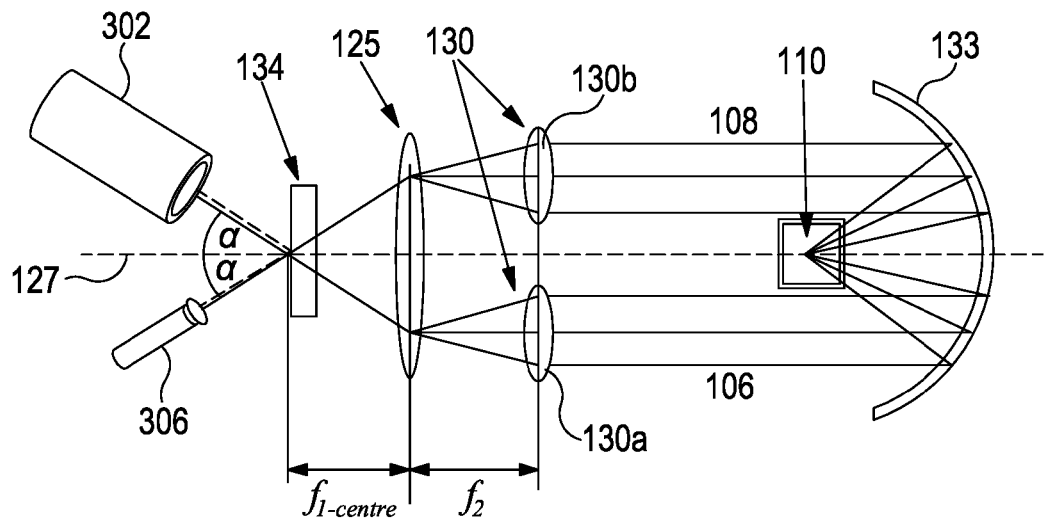
FIG. 16 is a schematic of a heterodyne backscatter detection embodiment of the second aspect, in which a curved mirror directs the illumination and detection optical paths into the sample carrier and a beam splitter is used to divert part of the illuminating light beam onto the sensor.
Figure 20:
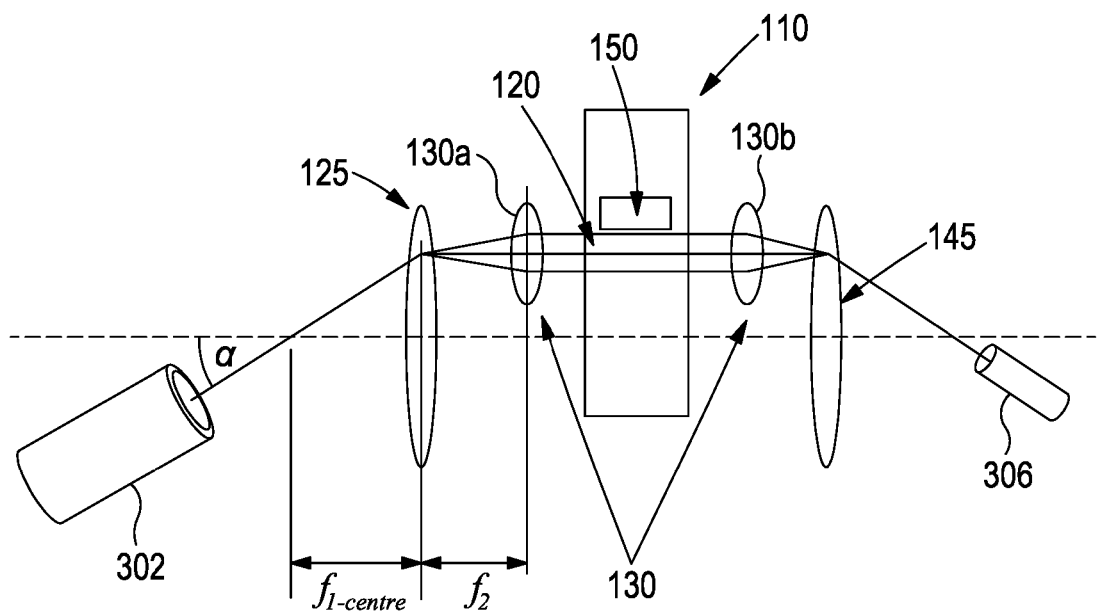
FIG. 20 is a schematic illustrating vertical alignment adjustment in a forward scatter detection arrangement of the third aspect.

FIG. 16 shows a heterodyne back scatter arrangement, which is the same as that shown in FIG. 20, but which includes a beam splitter 134, placed at the point of intersection of the illuminating optical path 106 and the detecting optical path 108. The beam splitter 134 is configured to direct a portion of the illuminating light beam from the illumination optical path 106 to the detector 306, as a reference beam for mixing with the scattered light on the detection optical path 108, so as to perform optical heterodyning at the detector 306. A beam splitter 134 may be used in any of the other embodiments described herein (e.g. that do not include a reflector), and is not limited to this particular example.

In some embodiments, it may be useful to modulate one of the reference beam and/or the scattered light, for example to perform heterodyne detection of low frequency particle movement (e.g. zeta potential measurement). At least one of the optical elements in the illumination and/or detection optical path may be moveable, so as to facilitate this.

Figure 17:
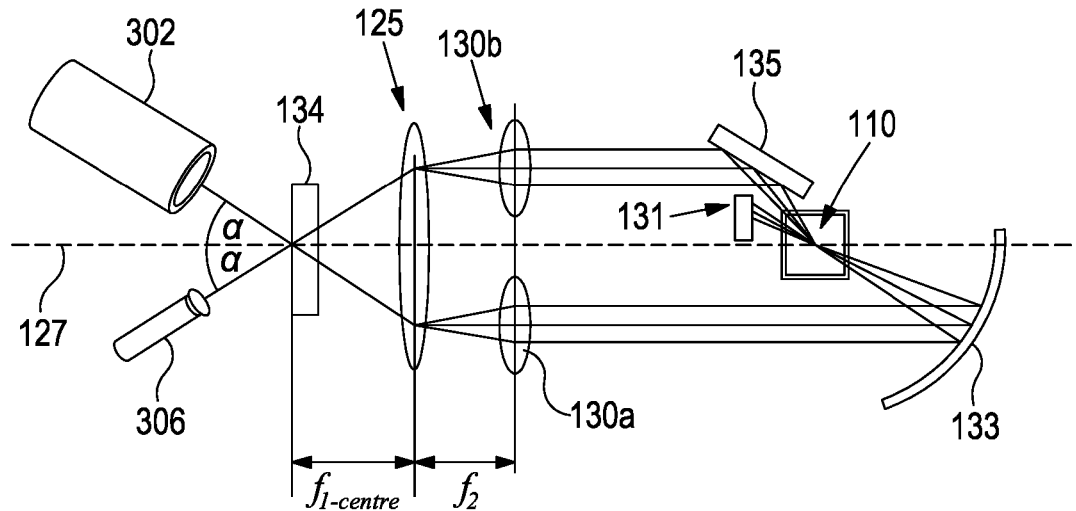
FIG. 17 is a schematic of an alternative heterodyne backscatter detection embodiment of the second aspect in which a plane mirror directs the detection optical path into the sample, and a curved mirror directs the illumination optical path into the sample.

An example embodiment that is suitable for modulated heterodyne detection in forward scatter is shown in FIG. 17. The illumination optical path 106 in this example is the same as shown in FIG. 16, except that the focusing mirror 133 is smaller, and is not employed in the detection optical path 108. Instead, the detection optical path 108 in FIG. 17 is configured to detect forward scatter, via plane mirror 135. The plane mirror 135 directs light scattered at a range of forward scattering angles to a focusing lens 130b, through the focus tuneable lens 125 and beam splitter 134, to the detector 306. The plane mirror 135 may be mounted on an actuator or a translation stage, operable to move/vibrate the plane mirror 135 (e.g. in a direction normal to the plane of the mirror), so as to spatially modulate the scattered light, thereby enabling modulated heterodyne detection at the detector 306. A beam dump 131 is provided to trap the illumination light beam after it has passed through the sample cell 110.

Figure 18:
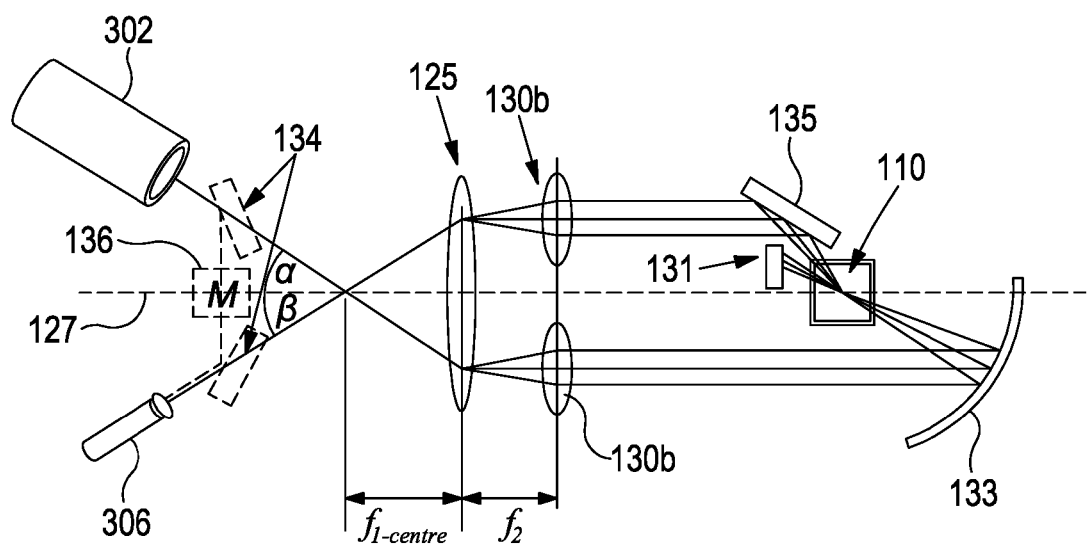
FIG. 18 is a schematic of a further alternative heterodyne backscatter detection embodiment of the second aspect in which a plane mirror directs the detection optical path into the sample, and a curved mirror directs the illumination optical path into the sample.

FIG. 18 shows an alternative embodiment suitable for modulated heterodyne forward scatter measurement, in which the respective angles α, β of incidence of the illumination optical path 106 and detection optical path 108 at the focus tuneable lens 125 are different, but which is otherwise similar to the example of FIG. 18. Instead of a beam splitter at the point of intersection of the illumination and detection optical paths 106, 108, a beam splitter is provided on the illumination optical path (before the focus tuneable lens 125) and a recombiner is provided on the detection optical path to combine the reference beam with the detection optical path 108 before the detector 306. A modulator 136 is provided in the optical path of the reference beam. In some embodiments the beam splitters and modulator may be omitted.

Any appropriate element may be actuated/vibrated to provide modulation, such as the detector 306, or the focusing mirror 133.

Figure 19:
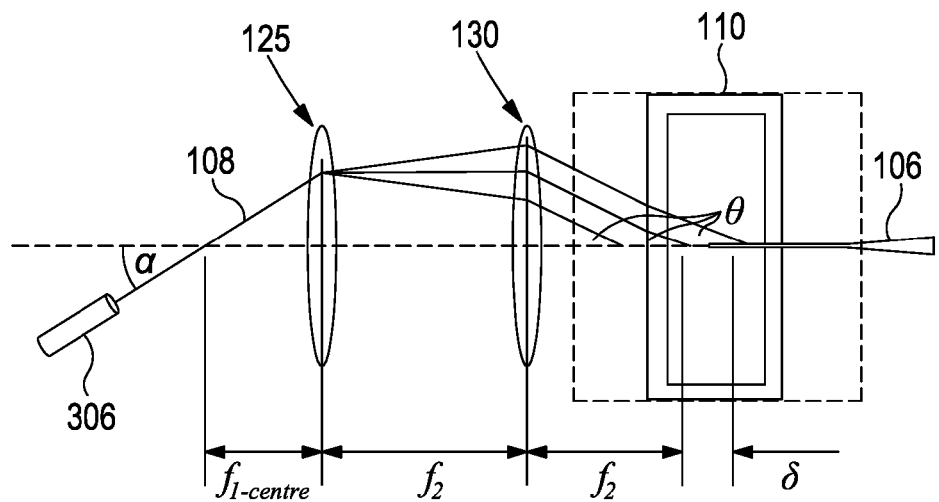
FIG. 19 is a schematic illustrating cell depth compensation in a forward scatter detection in accordance with the first aspect.

FIG. 19 shows an example of how a focus tuneable lens 125 may be used to compensate for different sizes and positions of sample cell 110, and/or to compensate for different sample wall refractive index and/or thickness in accordance with embodiments of the present disclosure. This example is a forward scatter detection arrangement, in which the illumination optical path 106 is shown in outline form only to improve clarity. Any illumination optical paths can be used on conjunction with the correction described herein.

When the sample cell 110 is large in cross section, a short focal length of the focus tuneable lens 125 can be used to place the scattering volume close to the wall of the sample cell 110 (for example, when the sample is turbid). When the sample cell 110 is smaller, a longer focal length may be appropriate. Sample cells 110 with different refractive indices and wall thicknesses will refract an angled detection optical path to different degrees, placing the scattering volume in different positions in the sample cell 110. Adjustment of the focal length of the focus tuneable lens 125 can be used to compensate for both different refractive indices and different cell wall thickness.

Figure 21:
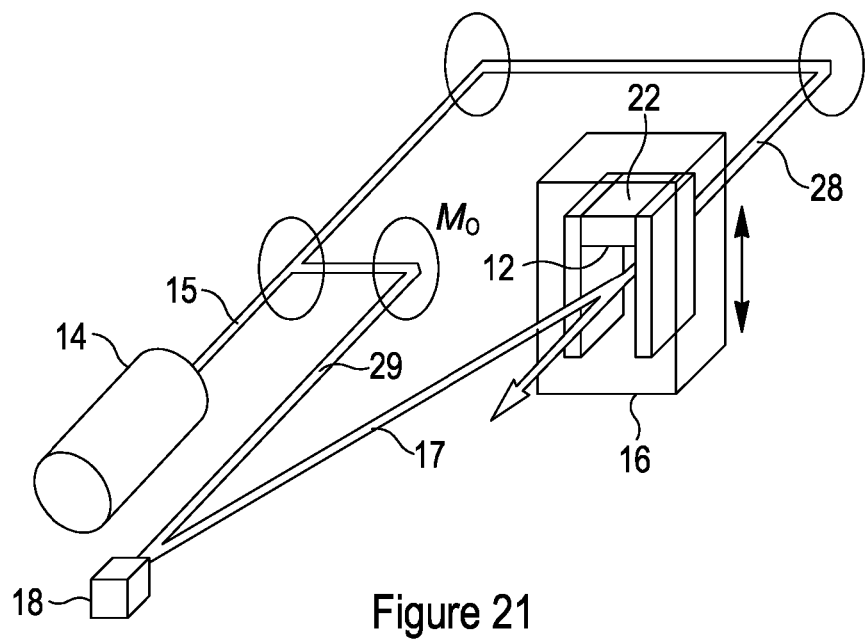
FIG. 21 is a prior art detection arrangement, from EP2721399.

Referring to FIG. 20, a dip cell arrangement is shown for measuring surface charge and/or electrophoretic mobility of particles suspended in a liquid, similar to that described in EP2721399 (and shown in FIG. 21). FIG. 21 shows a light source 14, a sample cell 16 for holding a sample 22 under test with its test surface 12 in contact with an electrolyte, and a detector 18. The instrument may be configured to determine the zeta potential of the test surface of the sample 22 under test.

Referring back to FIG. 20, the sample cell 110 forms a measurement chamber for receiving a sample holder 150. An arrangement is provided for applying an electric field to the sample in the sample holder 150. For example, the sample holder 150 may be provided with an pair of electrodes that are arranged in opposition (e.g. facing one another), and may be configured to hold a sample in position in a measurement volume between the pair of electrodes such that a planar surface of the sample is aligned orthogonally to the electrode surfaces.

In EP2721399 a mechanical actuator is provided to adjust a position of the planar surface of the sample with respect to a scattering volume from which light scattered from a fixed illuminating beam is detected. The arrangement of FIG. 20 illustrates how a focus tuneable lens 125, 145 can be used to vary the relative positions of the planar surface of the sample and the scattering volume 120 (e.g. to change how close the scattering volume is to the planar surface).

The focus tuneable lens 125, 145 in this example comprises an illumination focus tuneable lens 125 and a detection focus tuneable lens 145. The illumination focus tuneable lens 125 is disposed between the light source and the sample (between the light source 302 and focusing lens 130a). The detection focus tuneable lens 145 is disposed between the detector 306 and the sample (between the detector 306 and the focusing lens 130b).

In the example of FIG. 20 the light source 302 illuminates the scattering volume 120 via the illumination focus tuneable lens 125. The light source 302 is incident on the illumination focus tuneable lens 125 at an angle α to the axis of the illumination focus tuneable lens 125, and the illumination focus tuneable lens 125 refracts the illumination optical path to illuminate a location within the sample cell. A focusing lens 130a is provided between the illumination focus tuneable lens 125 and the sample cell 110, for example to collimate or focus the illuminating light beam within the sample cell 110. The detection optical path may be symmetric with the illumination optical path about the sample cell, having a corresponding detection focus tuneable lens 145 and focusing lens 130b. Adjustment of the focal length of the focus tuneable lenses 125, 145 has the effect of changing the position of the scattering volume 120 within the sample cell 110 (e.g. in the vertical direction). The measurement of surface charge can be more easily automated with such an arrangement, since there is no longer a need to adjust a mechanical actuator and physically move the sample holder with respect to the illumination optical path.

In any of the example embodiments disclosed herein, the focus tuneable lens may comprise an adjustable focal length cylindrical refracting or reflecting lens. In the embodiment of FIG. 20, the focus tuneable lens 125 could be replaced with an adjustable cylindrical lens or mirror. In this case, the illumination optical path between the light source and the focus tuneable lens 125 and a backscatter detection path from the focus tuneable lens 125 to a detector may both lie at an angle with respect to the optical path of the light beam in the sample (in/out of the plane of the page). Both the light beam and the backscattered light will pass through the focus tuneable lens 125 in this case. This enables the vertical position of the illumination and detection optical path in sample to be simultaneously altered. As the focus tuneable lens 125 is cylindrical, the same optical power will be imparted to both beams and the same angle of detection (between laser and detection path) maintained at each vertical position of the pair of the beams (illumination and detection), within the sample.

The optical detection path may be in a first plane, and the detection optical path may be in a second plane. The first and second plane may be at a non-zero angle to each other. The angle between the first and second plane may define the scattering angle.

Using the optical schemes disclosed herein, it is possible to use a variable focus lens to move the position of coincidence of the illumination and detection path into a single-mode, few-mode, multi-mode fibre, or a pinhole entrance aperture to another optical detection layout. This allows non-invasive backscatter detection to be implemented without any moving parts, significantly reducing wear over the lifetime of a particle characterisation instrument and allowing the possibility of modulating the measurement position at high frequency, (e.g. greater than 20 Hz), for instance for time resolved positional studies.

A number of other applications exist for embodiments which facilitate repositioning of the detection region. A concentration gradient (e.g. a vertical concentration gradient) may be determined by taking a plurality of measurements at different locations. The speed of repositioning of a focus tuneable lens may be faster than slewing a conventional optical element, enabling such analysis to occur more rapidly. Gel domain locations can be explored (in at least one of x, y and z directions), for example to investigate different rheological domains using DLS.

In some embodiments it may be possible to reposition an illumination or detection optical path to avoid a mark or surface inclusion on a low quality sample cell. Such a defect will generally result in a high count rate and a low intercept in the correlogram. If these features are present in the data and/or the correlogram, the apparatus may be configured to try a different measurement location and/or to seek a measurement location with a more optimal count rate and correlogram intercept (by varying the focal length of the focus tuneable lens).

In embodiments which facilitate adjustment of the detection optical path relative to the illumination optical path (e.g. as shown in FIG. 19) it may be possible to increase the dynamic range of an instrument to accommodate more strongly scattering samples without saturation of the detector by deliberately misaligning the illumination and detection optical path. This may be simpler and more elegant than including attenuation filters in the illumination and/or scattering optical paths.

It will be understood that features of each example can be combined with those of other examples. For example, in the embodiment of FIG. 20, a fibre array or a moving detection arrangement (similar to that shown in FIGS. 9 and 10) could be used instead of the focus tuneable lens 145.

Figure 22:
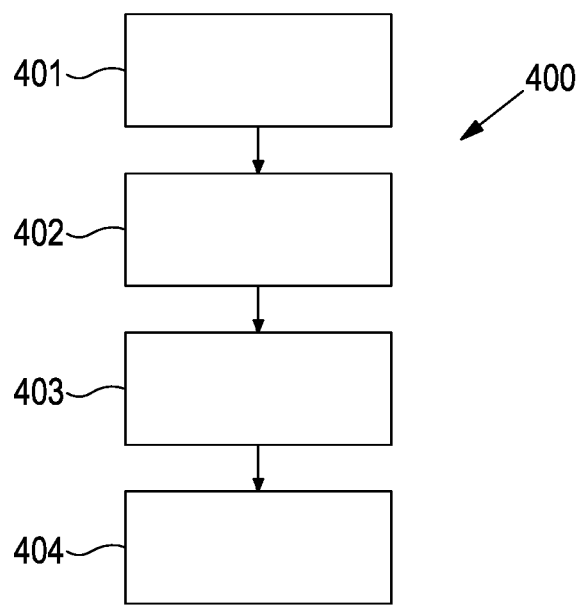
FIG. 22 is an outline flow diagram of a method of characterising particles suspended in a sample, in accordance with an embodiment.

Referring to FIG. 22 an example method in accordance with an embodiment is shown. The method includes estimating or determining a concentration of particles within a sample 401. For instance, the concentration of particles within the fluid may be measured (e.g. by UV spectroscopy). Alternatively, the user may inspect the sample visually to determine a qualitative measure of particle concentration within the sample (e.g. to determine whether the sample appears turbid). A particle characterisation instrument may be configured to automatically estimate the particle concentration (e.g. based on a scattering intensity measurement or count rate), or a user may input an estimate of particle concentration.

Following the step 401 of estimating/determining particle concentration, the location and volume of the detection region is adjusted 402, for example in response to the concentration of particles in the sample.

Once the detection region is adjusted, the detection region is illuminated, and light scattered by interactions of the illuminating beam with the sample is detected 403 (e.g. at a detector). The illumination may take place along an optical path similar to those described above. Similarly, the detection may take place along an optical path like those described above.

The data obtained by detecting the scattered light is subsequently analysed 404 in accordance with well-known dynamic light scattering techniques, so as to determine characteristics of the particles of the sample from the detected scattered light. Such analysis may be performed using a processor, and the results may be displayed on a screen or recorded on a medium (e.g. a computer readable medium).

Although example embodiments have been described in which the detection optical path is configured to detect backscattered light, in other embodiments the detection optical path may be configured to detect forward scattered light (e.g. scattered at less than 90 degrees from the illumination light beam axis). Furthermore, although examples have been described that use an optical fibre to couple the detector and/or the light source to the sample, it will be understood that the present invention is equally applicable to arrangements that use free space optics.

In each aspect or embodiment, the detector may provide a signal to a processor which may be configured to perform a dynamic light scattering analysis or static light scattering analysis to characterise particles (e.g. particle size and/or particle size distribution) within the sample. A display may be provided for displaying the results of such an analysis to a user.

Other variations and modifications will be apparent to the skilled person, and are intended to be within the scope of the invention, which is defined by the appended claims.

The invention claimed is:

1. A particle characterisation apparatus for performing a static light scattering measurement or a dynamic light scattering measurement comprising:
   a light source for illuminating a sample with a light beam, whereby the light beam reaches the sample from the light source along an illumination optical path length;
   a detector arranged to detect scattered light from the interaction of the light beam with the sample, whereby the scattered light reaches the detector along a detection optical path length;
   a focus tuneable lens arranged to collect the scattered light for the detector from a scattering volume and/or to direct the light beam into the sample;
   a focusing reflector configured to direct at least one of the illumination optical path into the sample and the detection optical path from the sample toward the detector; and
   wherein the focus tuneable lens is configured to vary the light beam position and/or light beam width incident on the focusing reflector.

2. The apparatus of claim 1, wherein the apparatus is configured so that varying the focal length of the focus tuneable lens changes the angle of intersection of the illumination and detection optical path within the sample without altering the position and/or size of the scattering volume.

3. The apparatus of claim 1, wherein the focusing reflector is configured to direct the illumination optical path into the sample and the detection optical path from the sample toward the detector.

4. The apparatus of claim 1, wherein both the illumination optical path and the detection optical path pass through the focus tuneable lens.

5. The apparatus of claim 1, wherein the focus tuneable lens comprises an optical axis, and the detection optical path on the detector side of the focus tuneable lens is at a first, non-zero, angle to the optical axis, and the illumination optical path on the light source side of the focus tuneable lens, is at a second, non-zero, angle to the optical axis.

6. The apparatus of claim 5, wherein the first angle and second angle are substantially equal.

7. The apparatus of claim 5, wherein the first angle and/or second angle is between 5 degrees and 15 degrees, and/or 10 degrees or less, and/or 5 degrees or less.

8. The apparatus of claim 1, wherein a scattering angle, being the angle between the detection optical path and illumination optical path at the scattering volume, is 10 degrees or less.

9. The apparatus of claim 1, wherein the illumination optical path and detection optical path lie in a common plane.

10. The apparatus of claim 1, wherein the detection optical path and the illumination optical path cross at a first location at a distance from the focus tuneable lens, and wherein the focus tuneable lens is operable to have a focal length that co-locates a focal point of the focus tuneable lens with the first location.

11. The apparatus of claim 10, wherein the focus tuneable lens is un-powered when the focal point is co-located with the first location.

12. The apparatus of claim 1, wherein decreasing a scattering angle, being the angle between the detection optical path and illumination optical path at the scattering volume, by adjusting the focus tuneable lens results in a decrease in the scattering volume.

13. The apparatus of claim 1, wherein the apparatus further comprises a beam splitter configured to direct some of the illuminating light beam onto the detector to mix with the scattered light from the detection optical path, and wherein the beam splitter is positioned at a point of intersection of the illumination optical path and detection optical path.

14. The apparatus of claim 1, further comprising an actuator for moving/vibrating at least one optical element in the illumination optical path and/or detection optical path, so as to facilitate modulated heterodyne optical detection by spatial light modulation of the illumination optical path and/or detection optical path.

15. The apparatus of claim 1, wherein the focus tuneable lens comprises a deformable lens and/or a material in which a refractive index may be varied by application of a stimulus.

16. The apparatus of claim 1, wherein the focus tuneable lens is arranged to collect at least one of: forward scattered light, back scattered light and side scattered light.

17. A method of performing a dynamic or static light scattering measurement, comprising:
   illuminating the sample with a light beam, thereby producing scattered light by the interaction of the light beam with the sample;
   detecting scattered light along a detection optical path that intersects the light beam within the sample at a detection region, thereby obtaining data;
   adjusting at least one of a location of the detection region, a volume of the detection region, or an angle between the illumination and detection optical path at the detection region, by changing the focal length of a focus tuneable lens in at least one of the illumination and detection optical path,
   wherein a focusing reflector is configured to direct at least one of the illumination optical path into the sample and the detection optical path from the sample toward the detector;
   repeating, at least once, the step of detecting scattered light after performing at least one corresponding step of adjustment by changing the focal length of the focus tuneable lens;
   performing a static or dynamic light scattering measurement using the data obtained from at least one focal length of the focus tuneable lens.

18. The method of claim 17, further comprising performing a dynamic light scattering measurement in which each adjusting step changes at least a position of the detection region, and each adjusting step is in response to measurement data corresponding with a preceding adjustment step.

19. The method of claim 17, comprising performing a dynamic or static light scattering measurement by obtaining measurement data from a plurality of scattering angles by adjusting the focal length of the focus tuneable lens.

* * * * *